US012634195B2

(12) United States Patent
Guo et al.

(10) Patent No.: US 12,634,195 B2
(45) Date of Patent: May 19, 2026

(54) RESOURCE SELECTION FOR SELF-CONTAINED INTER-USER-EQUIPMENT COORDINATION MESSAGE

(71) Applicant: QUALCOMM Incorporated, San Diego, CA (US)

(72) Inventors: Hui Guo, Beijing (CN); Tien Viet Nguyen, Bridgewater, NJ (US); Sourjya Dutta, San Diego, CA (US); Shijun Wu, San Diego, CA (US); Kapil Gulati, Belle Mead, NJ (US); Gabi Sarkis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 46 days.

(21) Appl. No.: 18/292,163

(22) PCT Filed: Sep. 28, 2021

(86) PCT No.: PCT/CN2021/121166
§ 371 (c)(1),
(2) Date: Jan. 25, 2024

(87) PCT Pub. No.: WO2023/050030
PCT Pub. Date: Apr. 6, 2023

(65) Prior Publication Data
US 2024/0333585 A1      Oct. 3, 2024

(51) Int. Cl.
*H04L 41/0803*      (2022.01)
*H04B 17/318*      (2015.01)
*H04L 5/00*      (2006.01)

(52) U.S. Cl.
CPC ....... *H04L 41/0803* (2013.01); *H04B 17/328* (2023.05); *H04L 5/0094* (2013.01)

(58) Field of Classification Search
CPC .. H04L 41/0803; H04L 5/0094; H04B 17/328
See application file for complete search history.

(56) References Cited

U.S. PATENT DOCUMENTS 10,834,641 B2 * 11/2020 Cai ........................ H04W 72/02
11,026,120 B2 * 6/2021 Khoryaev ............. H04L 5/0042
(Continued)

FOREIGN PATENT DOCUMENTS

CN          112333661 A      2/2021
CN          117981456 A  *  5/2024  ........... H04L 5/0094
(Continued)

OTHER PUBLICATIONS

Huawei., et al., "Inter-UE Coordination in Sidelink Resource Allocation", 3GPP TSG RAN WG1 Meeting #106-e, R1-2106478, 3rd Generation Partnership Project, Mobile Competence Centre, 650, Route Des Lucioles, F-06921 Sophia-Antipolis Cedex, France, vol. RAN WG1, No. E-meeting, Aug. 16, 2021-Aug. 27, 2021, Aug. 7, 2021, XP052037806, 33 Pages.
(Continued)

*Primary Examiner* — James R Sheleheda
(74) *Attorney, Agent, or Firm* — Harrity & Harrity, LLP

(57)          ABSTRACT

Various aspects of the present disclosure generally relate to wireless communication. In some aspects, a user equipment (UE) may receive a configuration for selecting a resource for a transmission of a self-contained inter-UE coordination message, wherein the configuration indicates an initial time interval, a step size for incrementing the initial time interval, and an available resource ratio associated with a resource selection window, and wherein the initial time interval is incremented by the step size until a quantity of available resources within the resource selection window satisfies the available resource ratio. The UE may select, based at least in part on the configuration, the resource for the transmission of the self-contained inter-UE coordination message from
(Continued)

the quantity of available resources within the resource selection window. The UE may transmit the self-contained inter-UE coordination message via the selected resource. Numerous other aspects are described.

21 Claims, 13 Drawing Sheets

(56) References Cited

U.S. PATENT DOCUMENTS

| | | | | |
|---|---|---|---|---|
| 2008/0082709 A1* | 4/2008 | Lee | G06F 13/387 | 710/240 |
| 2008/0159421 A1* | 7/2008 | Chen | H04L 27/2614 | 375/295 |
| 2011/0319032 A1* | 12/2011 | Pica | H04B 17/318 | 455/67.11 |
| 2018/0279259 A1* | 9/2018 | Gulati | H04L 5/0071 | |
| 2019/0132818 A1* | 5/2019 | Yasukawa | H04W 74/0816 | |
| 2019/0182840 A1* | 6/2019 | Feng | H04W 4/44 | |
| 2020/0029245 A1* | 1/2020 | Khoryaev | H04W 36/22 | |
| 2020/0029340 A1* | 1/2020 | He | H04W 72/044 | |
| 2020/0037343 A1* | 1/2020 | He | H04W 72/20 | |
| 2020/0280961 A1* | 9/2020 | Lee | H04W 4/40 | |
| 2021/0144681 A1* | 5/2021 | Gulati | H04W 24/08 | |
| 2021/0250954 A1* | 8/2021 | Li | H04W 72/56 | |
| 2021/0266895 A1* | 8/2021 | Wang | H04L 5/0044 | |
| 2021/0314821 A1* | 10/2021 | Huang | H04L 12/2869 | |
| 2021/0329501 A1* | 10/2021 | Dutta | H04W 74/0808 | |
| 2021/0352677 A1* | 11/2021 | Fouad | H04W 72/0466 | |
| 2021/0392620 A1* | 12/2021 | Ashraf | H04L 5/005 | |
| 2022/0030575 A1* | 1/2022 | Farag | H04W 72/02 | |
| 2022/0078758 A1* | 3/2022 | Lee | H04L 5/0053 | |
| 2022/0085923 A1* | 3/2022 | Ye | H04L 1/1864 | |
| 2022/0132469 A1* | 4/2022 | Aktas | H04W 72/02 | |
| 2022/0132486 A1* | 4/2022 | Aktas | H04W 72/541 | |
| 2022/0225408 A1* | 7/2022 | Lee | H04W 4/40 | |
| 2022/0287084 A1* | 9/2022 | Ko | H04W 72/0446 | |
| 2022/0287086 A1* | 9/2022 | Hwang | H04W 76/14 | |
| 2022/0361196 A1* | 11/2022 | Sarkis | H04W 72/569 | |
| 2022/0377733 A1* | 11/2022 | Ko | H04L 5/0037 | |
| 2022/0386312 A1* | 12/2022 | Abotabl | H04W 72/04 | |
| 2022/0394560 A1* | 12/2022 | Yu | H04W 72/02 | |
| 2023/0032706 A1* | 2/2023 | Wu | H04W 72/23 | |
| 2023/0038045 A1* | 2/2023 | Ko | H04W 76/28 | |
| 2023/0065878 A1* | 3/2023 | Kang | H04W 72/02 | |
| 2023/0148024 A1* | 5/2023 | Hwang | H04W 72/0446 | 370/329 |
| 2023/0180216 A1* | 6/2023 | Hwang | H04W 72/0453 | 370/329 |
| 2023/0199724 A1* | 6/2023 | Ko | H04W 72/25 | 370/329 |
| 2023/0199725 A1* | 6/2023 | Ko | H04W 92/18 | 370/329 |
| 2023/0232428 A1* | 7/2023 | Li | H04W 72/25 | 370/329 |
| 2023/0247652 A1* | 8/2023 | Du | H04W 72/02 | 370/329 |
| 2023/0254816 A1* | 8/2023 | Dutta | H04L 5/0053 | 370/329 |
| 2023/0262737 A1* | 8/2023 | Wang | H04W 72/25 | 370/329 |
| 2023/0292347 A1* | 9/2023 | Salim | H04L 5/0044 | |
| 2023/0328768 A1* | 10/2023 | Wu | H04W 72/20 | 370/252 |
| 2023/0354400 A1* | 11/2023 | Elshafie | H04W 72/20 | |
| 2023/0388970 A1* | 11/2023 | Ryu | H04L 1/08 | |
| 2023/0413186 A1* | 12/2023 | Wang | H04L 5/0048 | |
| 2024/0073865 A1* | 2/2024 | Ryu | H04W 72/20 | |
| 2024/0098764 A1* | 3/2024 | Ashraf | H04W 76/14 | |
| 2024/0244648 A1* | 7/2024 | Ko | H04L 1/1896 | |
| 2024/0251386 A1* | 7/2024 | Hwang | H04L 5/0094 | |
| 2024/0260002 A1* | 8/2024 | Ko | H04W 72/0446 | |
| 2024/0260059 A1* | 8/2024 | Guo | H04W 72/25 | |
| 2024/0260060 A1* | 8/2024 | Wu | H04W 72/563 | |
| 2024/0267892 A1* | 8/2024 | Ko | H04W 72/0446 | |
| 2024/0276463 A1* | 8/2024 | Hwang | H04W 72/25 | |
| 2024/0292378 A1* | 8/2024 | Khoryaev | H04W 72/40 | |
| 2024/0333585 A1* | 10/2024 | Guo | H04L 41/0803 | |
| 2024/0334458 A1* | 10/2024 | Ko | H04W 72/541 | |
| 2024/0349304 A1* | 10/2024 | Guo | H04B 17/328 | |
| 2024/0349338 A1* | 10/2024 | Zhou | H04W 72/25 | |
| 2024/0365344 A1* | 10/2024 | Ko | H04L 5/0094 | |
| 2024/0365363 A1* | 10/2024 | Nguyen | H04W 72/541 | |
| 2024/0381380 A1* | 11/2024 | Salim | H04W 16/28 | |
| 2024/0397529 A1* | 11/2024 | Nguyen | H04W 72/25 | |
| 2024/0430867 A1* | 12/2024 | Ko | H04W 4/40 | |
| 2025/0055580 A1* | 2/2025 | Ko | H04W 76/28 | |
| 2025/0097958 A1* | 3/2025 | Khoryaev | H04W 72/02 | |
| 2025/0106878 A1* | 3/2025 | Kumar | H04W 72/56 | |

FOREIGN PATENT DOCUMENTS

| | | | | |
|---|---|---|---|---|
| EP | 3866554 A1 | 8/2021 | | |
| EP | 4236534 A1 | 8/2023 | | |
| WO | 2019066629 A1 | 4/2019 | | |
| WO | 2020147825 A1 | 7/2020 | | |
| WO | 2021160632 A1 | 8/2021 | | |
| WO | WO-2023050030 A1 * | 4/2023 | | H04L 5/0094 |

OTHER PUBLICATIONS

International Search Report and Written Opinion—PCT/CN2021/121166—ISA/EPO—Jun. 24, 2022.
Spreadtrum Communications:"Discussion on Inter-UE Coordination in Sidelink Resource Allocation", 3GPP TSG RAN WG1 #106-e, R1-2106715, e-Meeting, Aug. 16-27, 2021, 6 Pages, The whole document.
Supplementary European Search Report—EP21958629—Search Authority—The Hague—May 21, 2025.

* cited by examiner

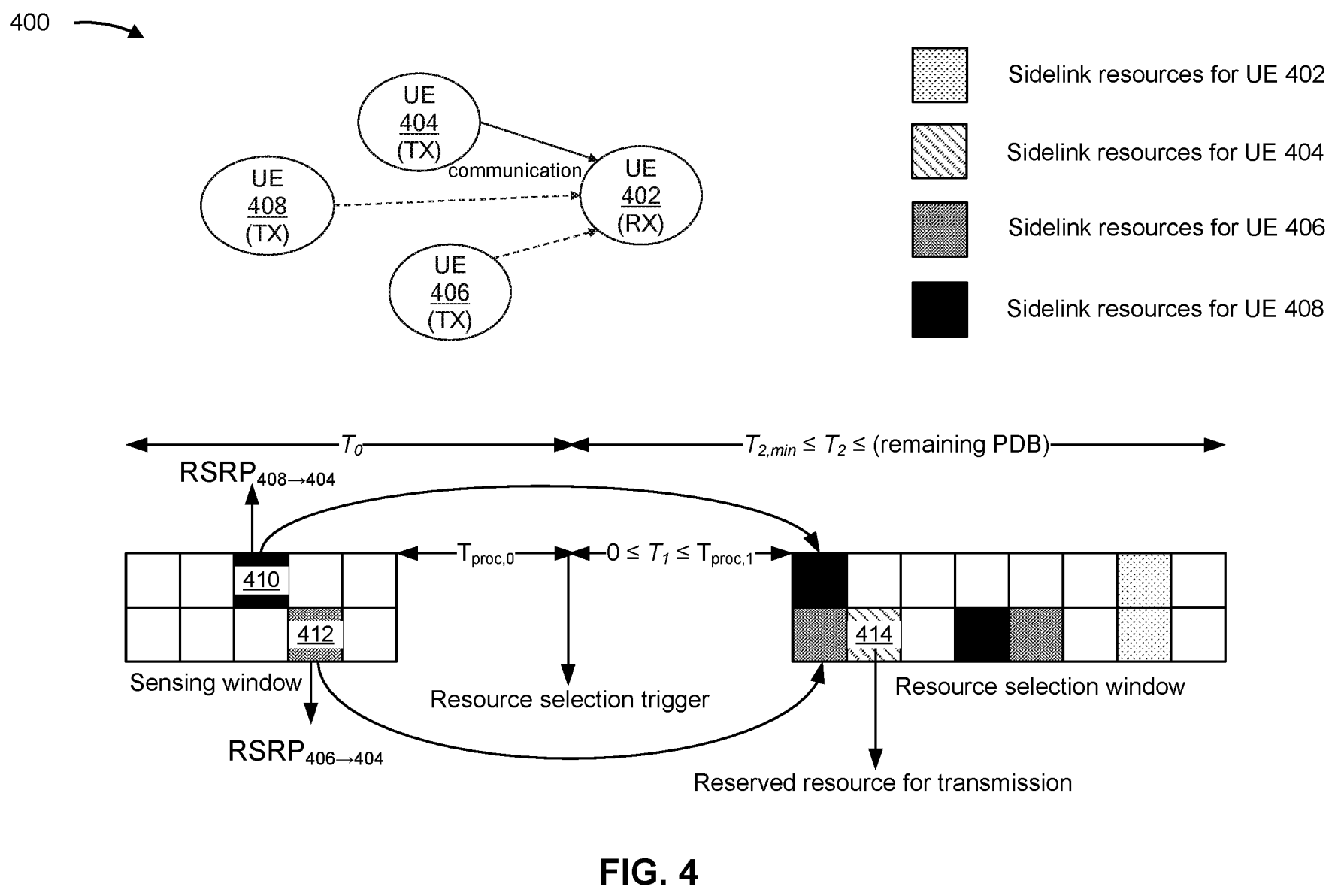

400

Sidelink resources for UE 402

Sidelink resources for UE 404

Sidelink resources for UE 406

Sidelink resources for UE 408

UE 402 (RX)

UE 404 (TX)

communication

UE 406 (TX)

UE 408 (TX)

$T_{2,min} \leq T_2 \leq$ (remaining PDB)

$0 \leq T_1 \leq T_{proc,1}$ $T_{proc,0}$ $T_0$

Resource selection window

Reserved resource for transmission

Resource selection trigger

414

410

412

$RSRP_{408 \rightarrow 404}$ $RSRP_{406 \rightarrow 404}$

Sensing window

FIG. 4

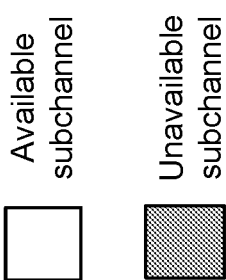
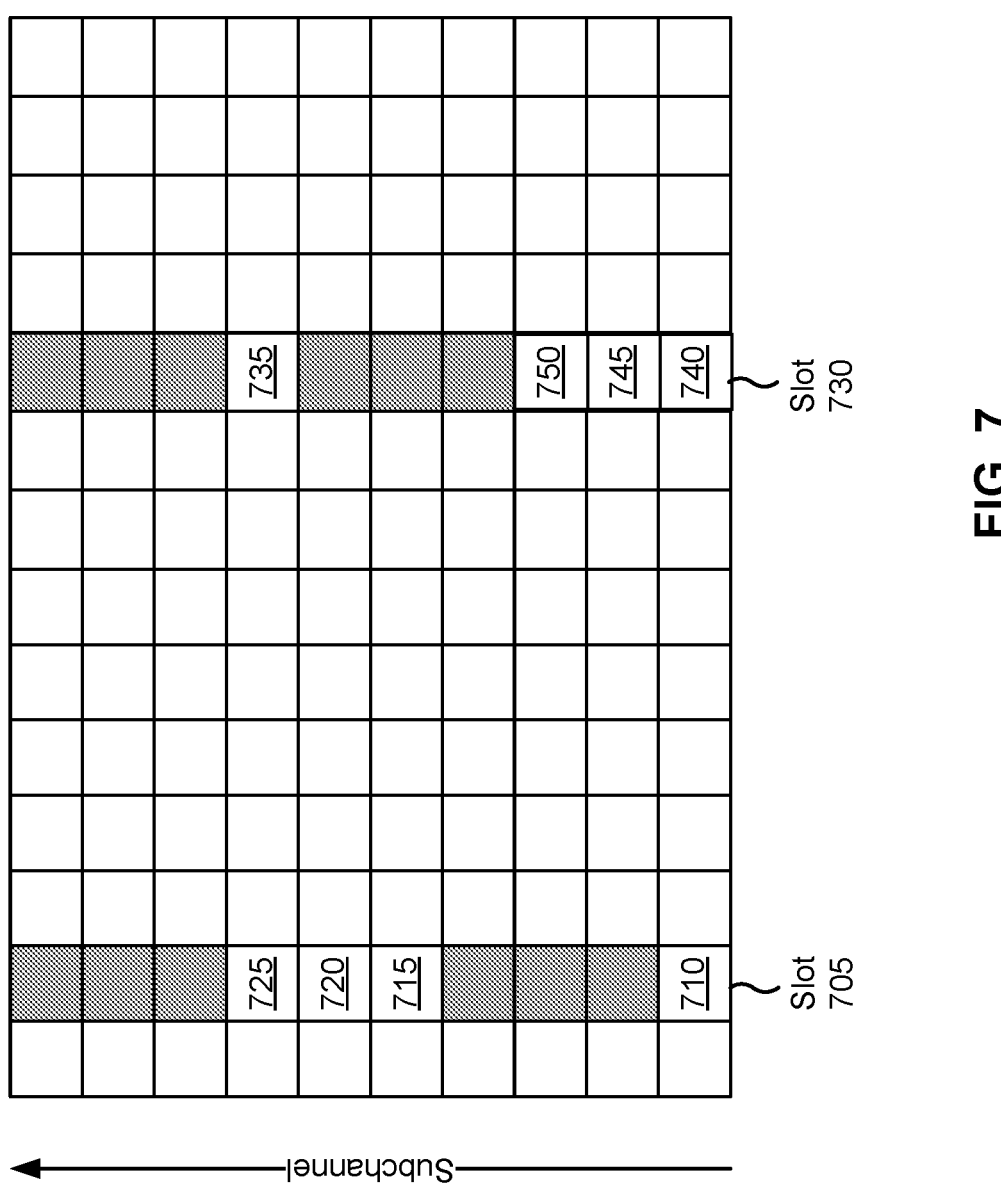
FIG. 7

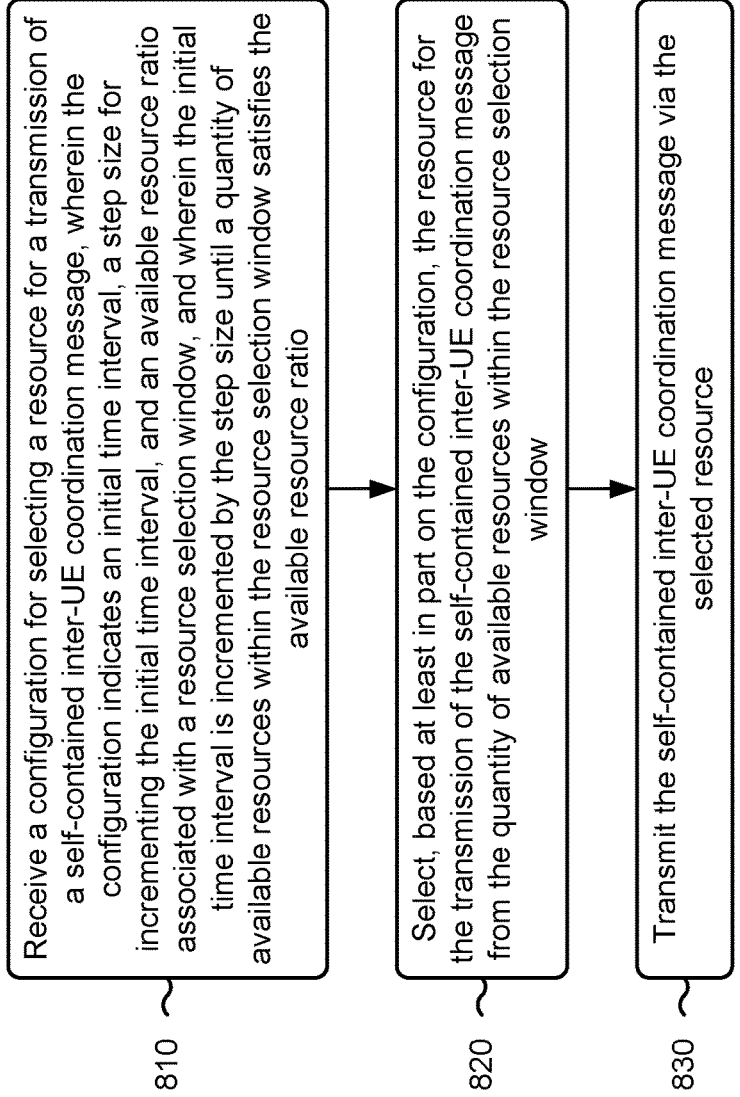

800

810   Receive a configuration for selecting a resource for a transmission of a self-contained inter-UE coordination message, wherein the configuration indicates an initial time interval, a step size for incrementing the initial time interval, and an available resource ratio associated with a resource selection window, and wherein the initial time interval is incremented by the step size until a quantity of available resources within the resource selection window satisfies the available resource ratio 820   Select, based at least in part on the configuration, the resource for the transmission of the self-contained inter-UE coordination message from the quantity of available resources within the resource selection window 830   Transmit the self-contained inter-UE coordination message via the selected resource

FIG. 8

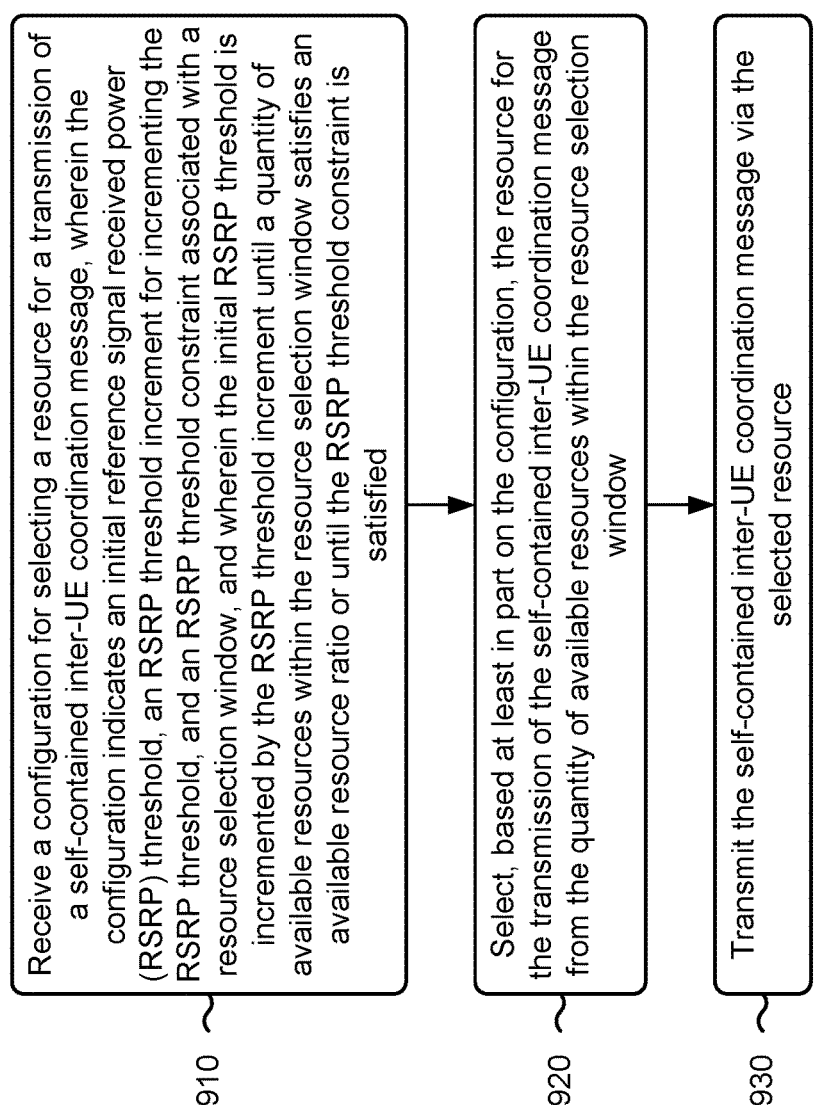

Receive a configuration for selecting a resource for a transmission of a self-contained inter-UE coordination message, wherein the configuration indicates an initial reference signal received power (RSRP) threshold, an RSRP threshold increment for incrementing the RSRP threshold, and an RSRP threshold constraint associated with a resource selection window, and wherein the initial RSRP threshold is incremented by the RSRP threshold increment until a quantity of available resources within the resource selection window satisfies an available resource ratio or until the RSRP threshold constraint is satisfied

910

Select, based at least in part on the configuration, the resource for the transmission of the self-contained inter-UE coordination message from the quantity of available resources within the resource selection window

920

Transmit the self-contained inter-UE coordination message via the selected resource

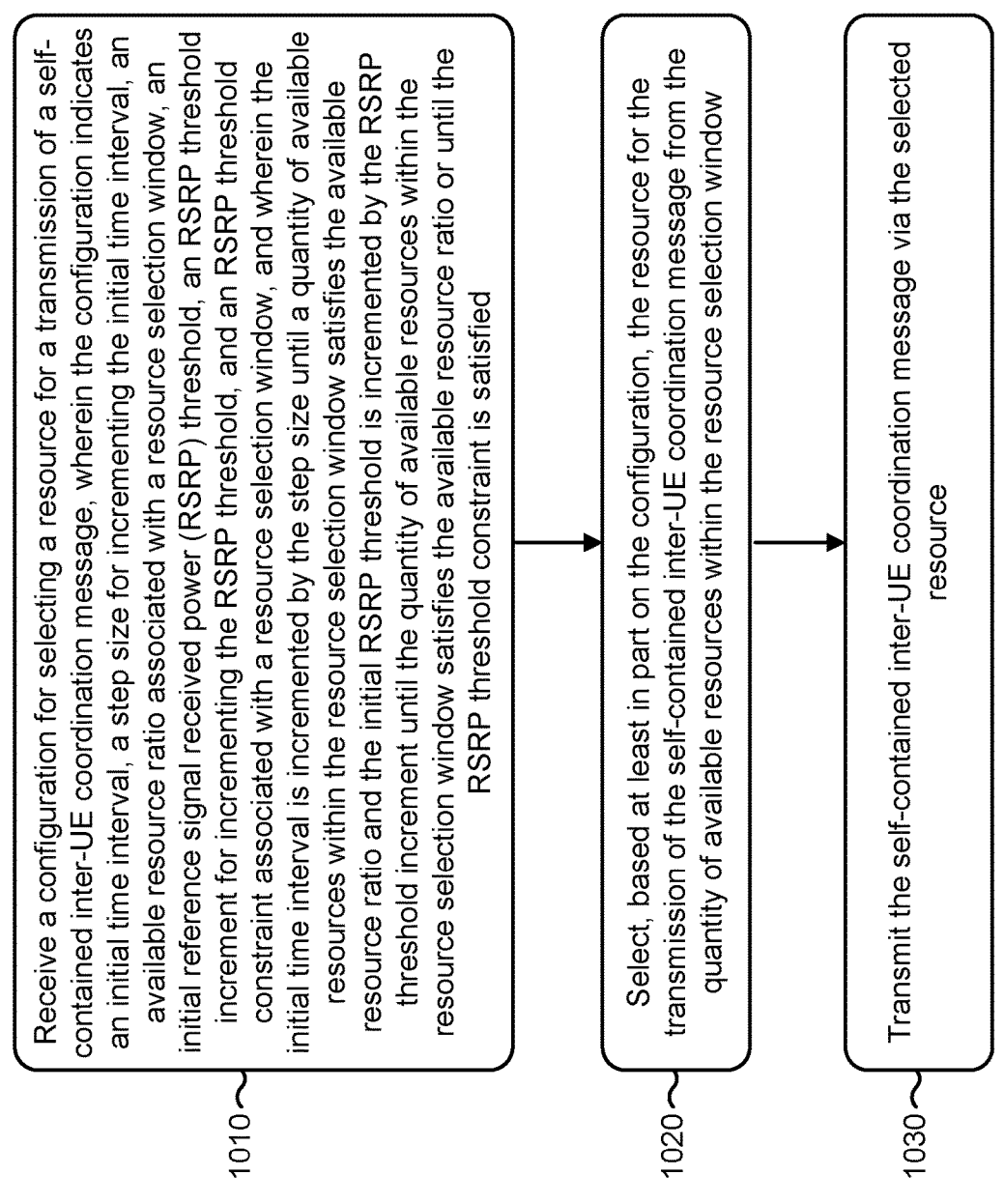

1010 Receive a configuration for selecting a resource for a transmission of a self-contained inter-UE coordination message, wherein the configuration indicates an initial time interval, a step size for incrementing the initial time interval, an available resource ratio associated with a resource selection window, an initial reference signal received power (RSRP) threshold, an RSRP threshold increment for incrementing the RSRP threshold, and an RSRP threshold constraint associated with a resource selection window, and wherein the initial time interval is incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied 1020 Select, based at least in part on the configuration, the resource for the transmission of the self-contained inter-UE coordination message from the quantity of available resources within the resource selection window 1030 Transmit the self-contained inter-UE coordination message via the selected resource

RESOURCE SELECTION FOR SELF-CONTAINED INTER-USER-EQUIPMENT COORDINATION MESSAGE

CROSS-REFERENCE TO RELATED APPLICATION

This application is a 371 national stage of Patent Cooperation Treaty (PCT) Application No. PCT/CN2021/121166 filed on Sep. 28, 2021, entitled "RESOURCE SELECTION FOR SELF-CONTAINED INTER-USER-EQUIPMENT COORDINATION MESSAGE," which is hereby expressly incorporated by reference herein.

FIELD OF THE DISCLOSURE

Aspects of the present disclosure generally relate to wireless communication and to techniques and apparatuses for resource selection for self-contained inter-user-equipment (inter-UE) coordination message.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration for selecting a resource for a transmission of a self-contained inter-UE coordination message, the configuration indicating an initial time interval, a step size for incrementing the initial time interval, and an available resource ratio associated with a resource selection window, and the initial time interval being incremented by the step size until a quantity of available resources within the resource selection window satisfies the available resource ratio. The method may include selecting, based at least in part on the configuration, the resource for the transmission of the self-contained inter-UE coordination message from the quantity of available resources within the resource selection window. The method may include transmitting the self-contained inter-UE coordination message via the selected resource.

Some aspects described herein relate to a method of wireless communication performed by a UE. The method may include receiving a configuration for selecting a resource for a transmission of a self-contained inter-UE coordination message, the configuration indicating an initial reference signal received power (RSRP) threshold, an RSRP threshold increment for incrementing the RSRP threshold, and an RSRP threshold constraint associated with a resource selection window, and the initial RSRP threshold being incremented by the RSRP threshold increment until a quantity of available resources within the resource selection window satisfies an available resource ratio or until the RSRP threshold constraint is satisfied. The method may include selecting, based at least in part on the configuration, the resource for the transmission of the self-contained inter-UE coordination message from the quantity of available resources within the resource selection window. The method may include transmitting the self-contained inter-UE coordination message via the selected resource.

Some aspects described herein relate to a method of wireless communication performed by a UE. The method may include receiving a configuration for selecting a resource for a transmission of a self-contained inter-UE coordination message, the configuration indicating an initial time interval, a step size for incrementing the initial time interval, an available resource ratio associated with a resource selection window, an initial RSRP threshold, an RSRP threshold increment for incrementing the RSRP threshold, and an RSRP threshold constraint associated with a resource selection window, and the initial time interval being incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied. The method may include selecting, based at least in part on the configuration, the resource for the transmission of the self-contained inter-UE coordination message from the quantity of available resources within the resource selection window. The method may include transmitting the self-contained inter-UE coordination message via the selected resource.

Some aspects described herein relate to a UE for wireless communication. The user equipment may include a memory and one or more processors coupled to the memory. The one or more processors may be configured to receive a configuration for selecting a resource for a transmission of a self-contained inter-UE coordination message, the configuration indicating an initial time interval, a step size for incrementing the initial time interval, and an available resource ratio associated with a resource selection window, and the initial time interval being incremented by the step size until a quantity of available resources within the resource selection window satisfies the available resource ratio. The one or more processors may be configured to select, based at least in part on the configuration, the resource for the transmission of the self-contained inter-UE coordination message from the quantity of available resources within the resource selection window. The one or more processors may be configured to transmit the self-contained inter-UE coordination message via the selected resource.

Some aspects described herein relate to a UE for wireless communication. The UE may include a memory and one or more processors coupled to the memory. The one or more processors may be configured to receive a configuration for selecting a resource for a transmission of a self-contained inter-UE coordination message, the configuration indicating an initial RSRP threshold, an RSRP threshold increment for incrementing the RSRP threshold, and an RSRP threshold constraint associated with a resource selection window, and the initial RSRP threshold being incremented by the RSRP threshold increment until a quantity of available resources within the resource selection window satisfies an available resource ratio or until the RSRP threshold constraint is satisfied. The one or more processors may be configured to select, based at least in part on the configuration, the resource for the transmission of the self-contained inter-UE coordination message from the quantity of available resources within the resource selection window. The one or more processors may be configured to transmit the self-contained inter-UE coordination message via the selected resource.

Some aspects described herein relate to a UE for wireless communication. The UE may include a memory and one or more processors coupled to the memory. The one or more processors may be configured to receive a configuration for selecting a resource for a transmission of a self-contained inter-UE coordination message, the configuration indicating an initial time interval, a step size for incrementing the initial time interval, an available resource ratio associated with a resource selection window, an initial RSRP threshold, an RSRP threshold increment for incrementing the RSRP threshold, and an RSRP threshold constraint associated with a resource selection window, and the initial time interval being incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied. The one or more processors may be configured to select, based at least in part on the configuration, the resource for the transmission of the self-contained inter-UE coordination message from the quantity of available resources within the resource selection window. The one or more processors may be configured to transmit the self-contained inter-UE coordination message via the selected resource.

Some aspects described herein relate to a non-transitory computer-readable medium that stores a set of instructions for wireless communication by a UE. The set of instructions, when executed by one or more processors of the UE, may cause the UE to receive a configuration for selecting a resource for a transmission of a self-contained inter-UE coordination message, the configuration indicating an initial time interval, a step size for incrementing the initial time interval, and an available resource ratio associated with a resource selection window, and the initial time interval being incremented by the step size until a quantity of available resources within the resource selection window satisfies the available resource ratio. The set of instructions, when executed by one or more processors of the UE, may cause the UE to select, based at least in part on the configuration, the resource for the transmission of the self-contained inter-UE coordination message from the quantity of available resources within the resource selection window. The set of instructions, when executed by one or more processors of the UE, may cause the UE to transmit the self-contained inter-UE coordination message via the selected resource.

Some aspects described herein relate to a non-transitory computer-readable medium that stores a set of instructions for wireless communication by a UE. The set of instructions, when executed by one or more processors of the UE, may cause the UE to receive a configuration for selecting a resource for a transmission of a self-contained inter-UE coordination message, the configuration indicating RSRP threshold, an RSRP threshold increment for incrementing the RSRP threshold, and an RSRP threshold constraint associated with a resource selection window, and the initial RSRP threshold being incremented by the RSRP threshold increment until a quantity of available resources within the resource selection window satisfies an available resource ratio or until the RSRP threshold constraint is satisfied. The set of instructions, when executed by one or more processors of the UE, may cause the UE to select, based at least in part on the configuration, the resource for the transmission of the self-contained inter-UE coordination message from the quantity of available resources within the resource selection window. The set of instructions, when executed by one or more processors of the UE, may cause the UE to transmit the self-contained inter-UE coordination message via the selected resource.

Some aspects described herein relate to a non-transitory computer-readable medium that stores a set of instructions for wireless communication by a UE. The set of instructions, when executed by one or more processors of the UE, may cause the UE to receive a configuration for selecting a resource for a transmission of a self-contained inter-UE coordination message, the configuration indicating an initial time interval, a step size for incrementing the initial time interval, an available resource ratio associated with a resource selection window, an initial RSRP threshold, an RSRP threshold increment for incrementing the RSRP threshold, and an RSRP threshold constraint associated with a resource selection window, and the initial time interval being incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied. The set of instructions, when executed by one or more processors of the UE, may cause the UE to select, based at least in part on the configuration, the resource for the transmission of the self-contained inter-UE coordination message from the quantity of available resources within the resource selection window. The set of instructions, when executed by one or more processors of the UE, may cause the UE to transmit the self-contained inter-UE coordination message via the selected resource.

Some aspects described herein relate to an apparatus for wireless communication. The apparatus may include means for receiving a configuration for selecting a resource for a transmission of a self-contained inter-UE coordination message, the configuration indicating an initial time interval, a step size for incrementing the initial time interval, and an available resource ratio associated with a resource selection window, and the initial time interval being incremented by the step size until a quantity of available resources within the resource selection window satisfies the available resource ratio. The apparatus may include means for selecting, based at least in part on the configuration, the resource for the transmission of the self-contained inter-UE coordination message from the quantity of available resources within the resource selection window. The apparatus may include means for transmitting the self-contained inter-UE coordination message via the selected resource.

Some aspects described herein relate to an apparatus for wireless communication. The apparatus may include means for receiving a configuration for selecting a resource for a transmission of a self-contained inter-UE coordination message, the configuration indicating an initial RSRP threshold, an RSRP threshold increment for incrementing the RSRP threshold, and an RSRP threshold constraint associated with a resource selection window, and the initial RSRP threshold being incremented by the RSRP threshold increment until a quantity of available resources within the resource selection window satisfies an available resource ratio or until the RSRP threshold constraint is satisfied. The apparatus may include means for selecting, based at least in part on the configuration, the resource for the transmission of the self-contained inter-UE coordination message from the quantity of available resources within the resource selection window. The apparatus may include means for transmitting the self-contained inter-UE coordination message via the selected resource.

Some aspects described herein relate to an apparatus for wireless communication. The apparatus may include means for receiving a configuration for selecting a resource for a transmission of a self-contained inter-UE coordination message, the configuration indicating an initial time interval, a step size for incrementing the initial time interval, an available resource ratio associated with a resource selection window, an initial RSRP threshold, an RSRP threshold increment for incrementing the RSRP threshold, and an RSRP threshold constraint associated with a resource selection window, and the initial time interval being incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied. The apparatus may include means for selecting, based at least in part on the configuration, the resource for the transmission of the self-contained inter-UE coordination message from the quantity of available resources within the resource selection window. The apparatus may include means for transmitting the self-contained inter-UE coordination message via the selected resource.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of selecting sidelink resources, in accordance with the present disclosure.

FIGS. 5-7 are diagrams illustrating examples associated with resource selection for self-contained inter-UE coordination messages, in accordance with the present disclosure.

FIGS. 8-10 are diagrams illustrating example processes associated with resource selection for self-contained inter-UE coordination messages, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
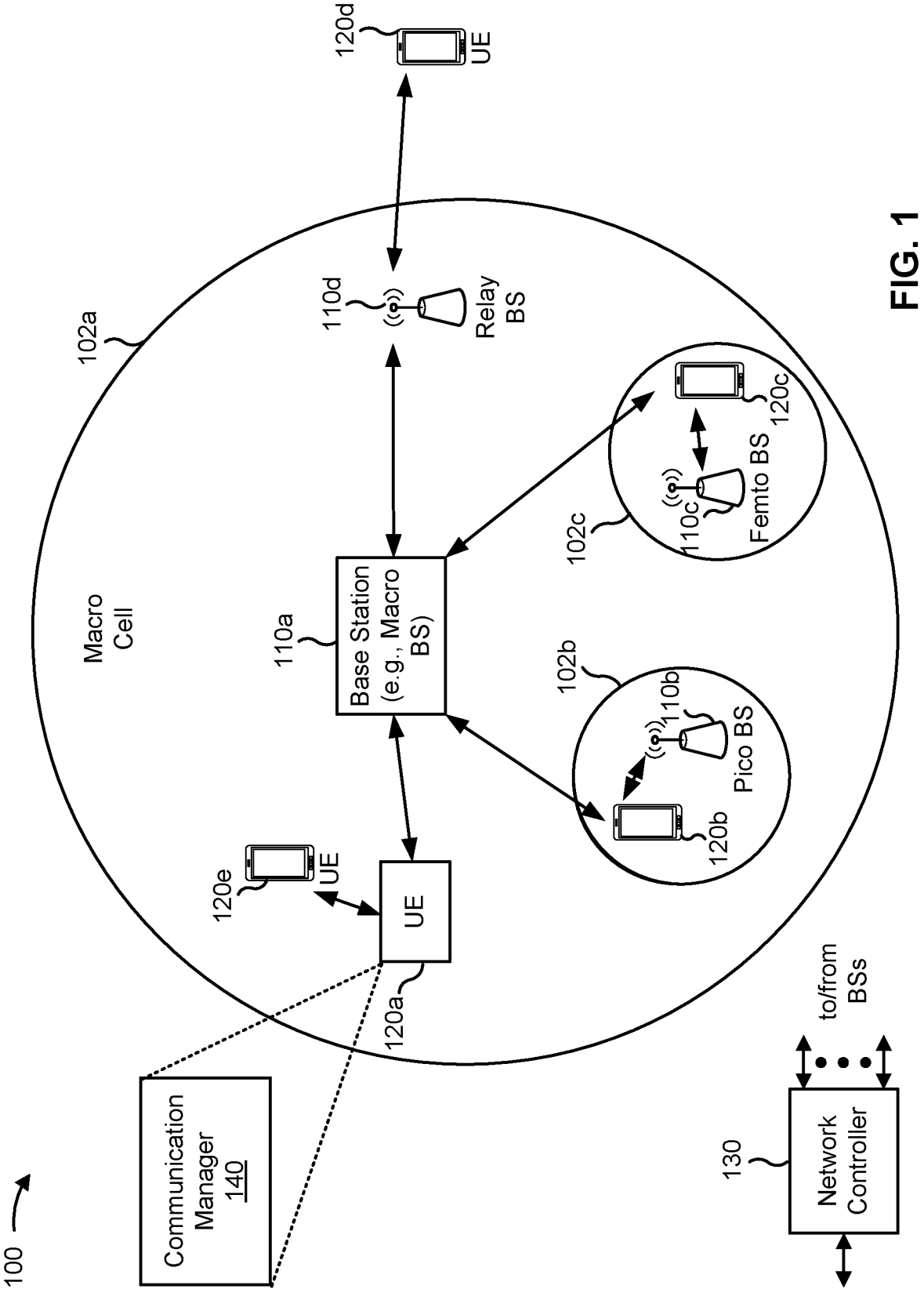
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with resource selection for self-contained inter-UE coordination messages. Additionally, or alternatively, the communication manager 140 may perform one or more other operations described herein.

As indicated above, FIG. 1 is provided as an example. Other examples may differ from what is described with regard to FIG. 1.

Figure 2:
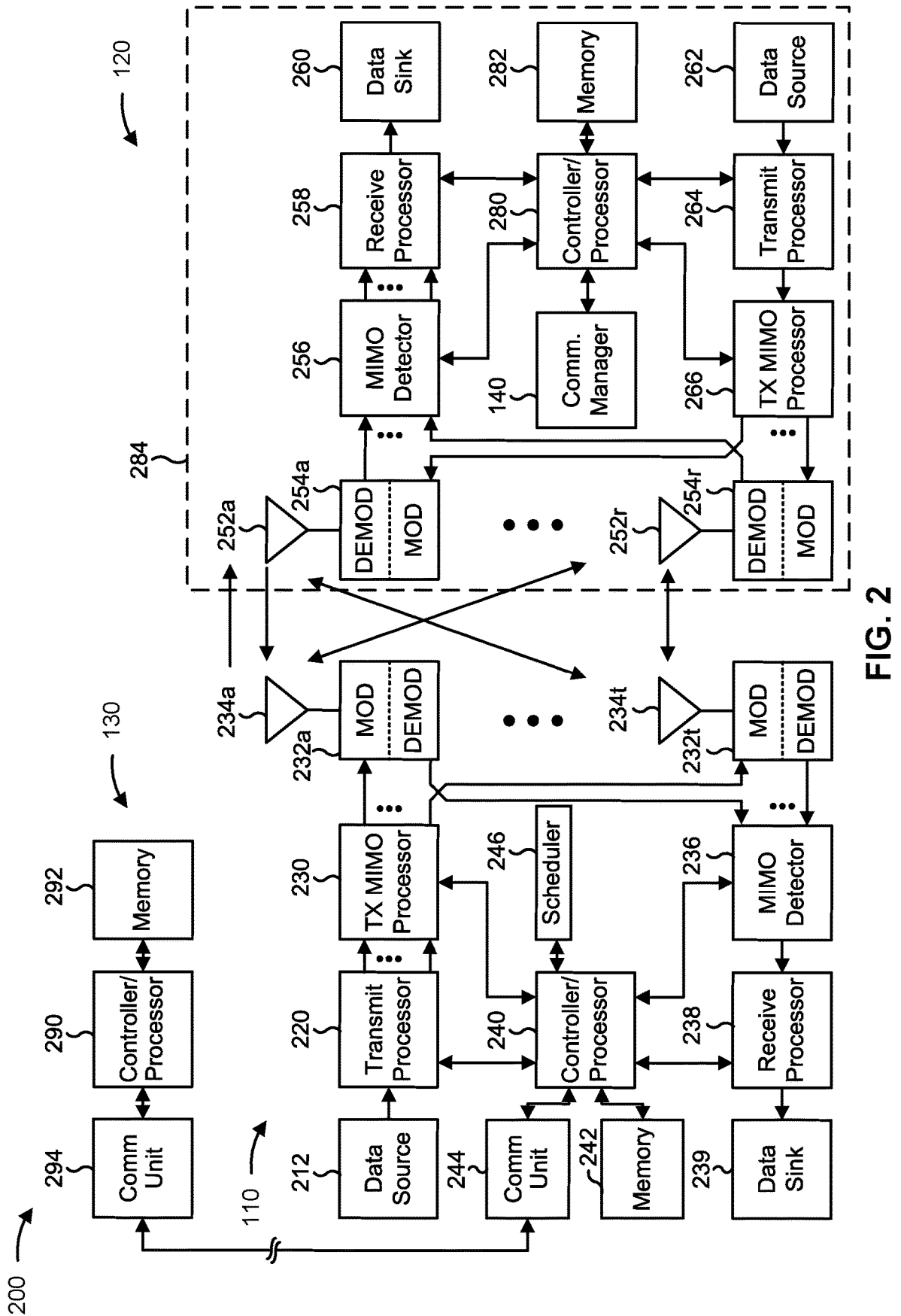
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s)

selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the base station 110, the controller/processor 280 of the UE 120, and/or any other component(s) of FIG. 2 may perform one or more techniques associated with resource selection for self-contained inter-UE coordination messages, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for receiving a configuration for selecting a resource for a transmission of a self-contained inter-UE coordination message, wherein the configuration indicates an initial time interval, a step size for incrementing the initial time interval, and an available resource ratio associated with a resource selection window, and wherein the initial time interval is incremented by the step size until a quantity of available resources within the resource selection window satisfies the available resource ratio; means for selecting, based at least in part on the configuration, the resource for the transmission of the self-contained inter-UE coordination message from the quantity of available resources within the resource selection window; and/or means for transmitting the self-contained inter-UE coordination message via the selected resource. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving a configuration for selecting a resource for a transmission of a self-contained inter-UE coordination message, wherein the configuration indicates an initial reference signal received power (RSRP) threshold, an RSRP threshold increment for incrementing the RSRP threshold, and an RSRP threshold constraint associated with a resource selection window, and wherein the initial RSRP threshold is incremented by the RSRP threshold increment until a quantity of available resources within the resource selection window satisfies an available resource ratio or until the RSRP threshold constraint is satisfied; means for selecting, based at least in part on the configuration, the resource for the transmission of the self-contained inter-UE coordination message from the quantity of available resources within the resource selection window; and/or means for transmitting the self-contained inter-UE coordination message via the selected resource. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving a configuration for selecting a resource for a transmission of a self-contained inter-UE coordination message, wherein the configuration indicates an initial time interval, a step size for incrementing the initial time interval, an available resource ratio associated with a resource selection window, an initial RSRP threshold, an RSRP threshold increment for incrementing the RSRP threshold, and an RSRP threshold constraint associated with a resource selection window, and wherein the initial time interval is incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied; means for selecting, based at least in part on the configuration, the resource for the transmission of the self-contained inter-UE coordination message from the quantity of available resources within the resource selection window; and/or means for transmitting the self-contained inter-UE coordination message via the selected resource. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
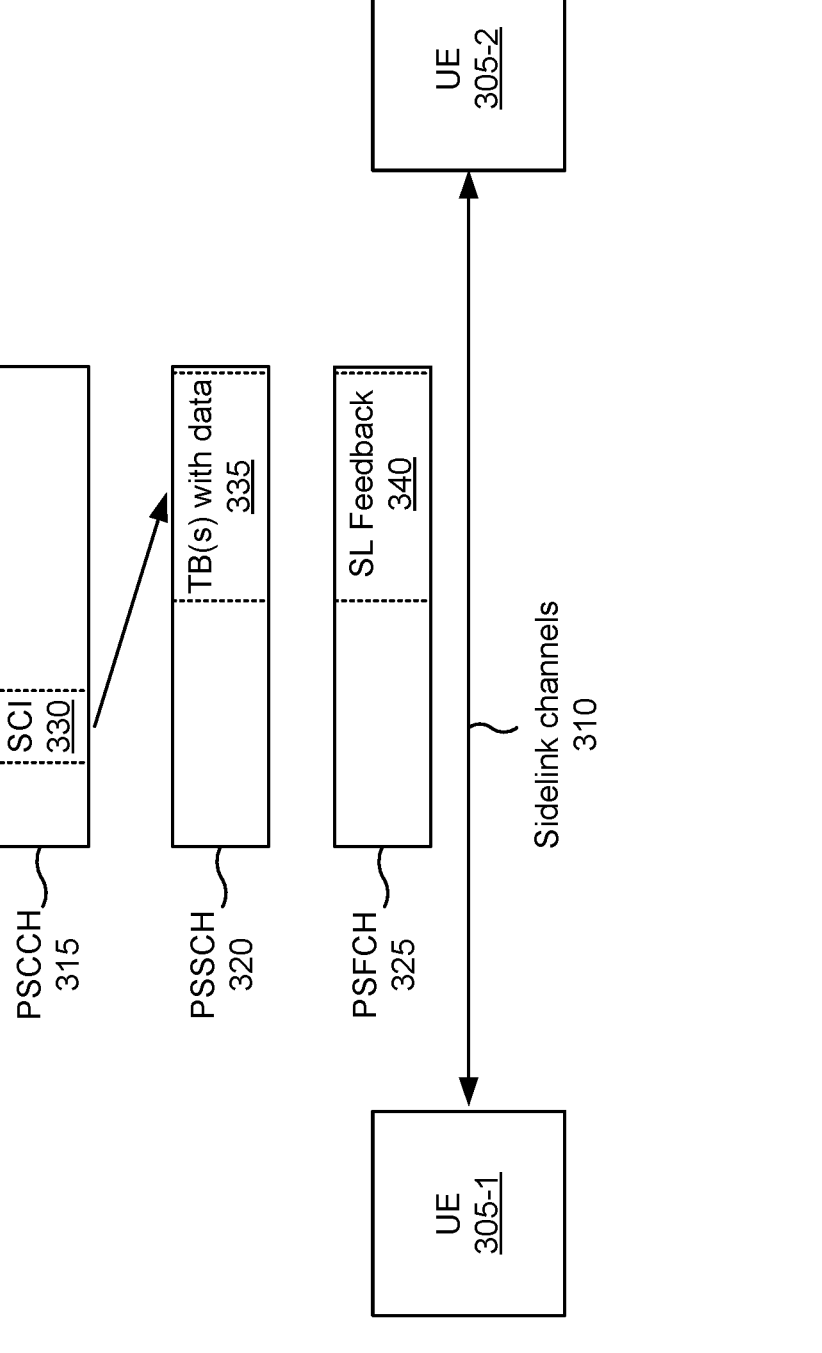
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

FIG. 4 is a diagram illustrating an example 400 of selecting sidelink resources, in accordance with the present disclosure. Example 400 shows a UE 402 (e.g., UE 305-1) that may receive communications on a sidelink channel from other UEs (e.g., a UE 305-2), such as UE 404, UE 406, and/or UE 408, as shown in FIG. 4.

As shown in FIG. 4, UE 404 is a transmitting UE that is transmitting communications to UE 402, which is a receiving UE. If UE 404 is to transmit a communication to UE 402, UE 404 may sense the sidelink channel in a sensing window to determine which sidelink resources (e.g., subcarriers, subchannels) are available. A sidelink resource may be considered available if the sidelink resource was clear or had a signal energy (e.g., RSRP) that satisfied an availability threshold (e.g., measured interference or energy on the channel is lower than a maximum decibel-milliwatts (dBm) or dB, RSRP threshold). The availability threshold may be configured per transmission priority and receive priority pair. UE 404 may measure DMRSs on a PSCCH or a PSSCH, according to a configuration.

For example, UE 404 may prepare to transmit a communication to UE 402. UE 404 may have already sensed previous sidelink resources and successfully decoded SCI from UE 406 and UE 408. UE 404 may try to reserve sidelink resources, and thus may check the availability of the future sidelink resources reserved by UE 406 and UE 408 by sensing the sidelink channel in the sensing window. UE 404 may measure an RSRP of a signal from UE 408 in sidelink resource 410, and an RSRP of a signal from UE 406 in sidelink resource 412. If an observed RSRP satisfies the RSRP threshold (e.g., is lower than a maximum RSRP), the corresponding sidelink resource may be available for reservations by UE 404. UE 404 may reserve the sidelink resource (which may be a random selection from available resources). For example, UE 404 may select and reserve sidelink resource 414 for transmission. This may be in a time slot after which UE 406 and UE 408 had used sidelink resources, and UE 404 may have sensed these sidelink resources earlier.

There may be a resource selection trigger to trigger selection of sidelink resources after a processing time $T_{proc,0}$, and before another processing time $T_{proc,1}$ before a resource selection window from which sidelink resources are available. The resource selection window may be a time window from which sidelink resources may be selected, and the resource selection window may extend for a remaining packet delay budget (PDB). $T_0$, shown in FIG. 4, may be a configured value, such as 100 milliseconds (ms) or 1100 ms. $T_1$ may be a time duration that is specific to a UE's implementation. $T_{2,min}$ may be configured per priority {1, 5, 10, 20} times $2^\mu$, where $\mu=0$, 1, 2, and 3 for subcarrier spacing of 15 kilohertz (kHz), 30 kHz, 60 kHz, and 120 kHz, respectively.

If resource selection is triggered, UE 404 may use SCIs detected during the sensing window. If another UE (e.g., 406, 408) is reserving a resource in the resource selection window, UE 404 may compare a measured RSRP from the other UE and compare it against an RSRP threshold. For example, UE 404 may compare the measured RSRP from the other UE against an RSRP threshold given for a pair of priorities ($p_i$, $p_j$), where $p_i$ is the priority of the packet for which UE 404 is reserving a resource, and $p_j$ is the priority of the packet of the other UE. If the measured RSRP is below the threshold, UE 404 may determine that the resource is available for transmitting the communication to UE 402.

In some cases, prior to selecting the resource and/or transmitting the communication to UE 402, the UE 404 may request coordination information to assist UE 404 in selecting the resource. For example, UE 404 may transmit an inter-UE coordination request to the UE 402. The UE 402 may receive the inter-UE coordination request and may generate an inter-UE coordination message that includes scheme 1 coordination information. The scheme 1 coordination information may indicate a preferred resource for the transmission of the communication (e.g., Type A coordination information) or a non-preferred resource for the transmission of the communication (e.g., Type B coordination information).

In some cases, the inter-UE coordination message may be a self-contained inter-UE coordination message. A self-contained inter-UE coordination message may be an inter-UE coordination message that is transmitted separate from a data transmission (rather than multiplexed with a data transmission). The UE 402 may perform a resource sensing and selection procedure similar to that described above. Some techniques and apparatuses described herein may relate to a resource selection procedure that enables a UE to select a resource for transmitting a self-contained inter-UE coordination message. The resource selection procedure may ensure that a quantity of available resources within a resource selection window are sufficient for transmitting the inter-UE coordination message while reducing a risk of introducing interference to data transmissions.

As indicated above, FIG. 4 is provided as an example. Other examples may differ from what is described with regard to FIG. 4.

Figure 5:
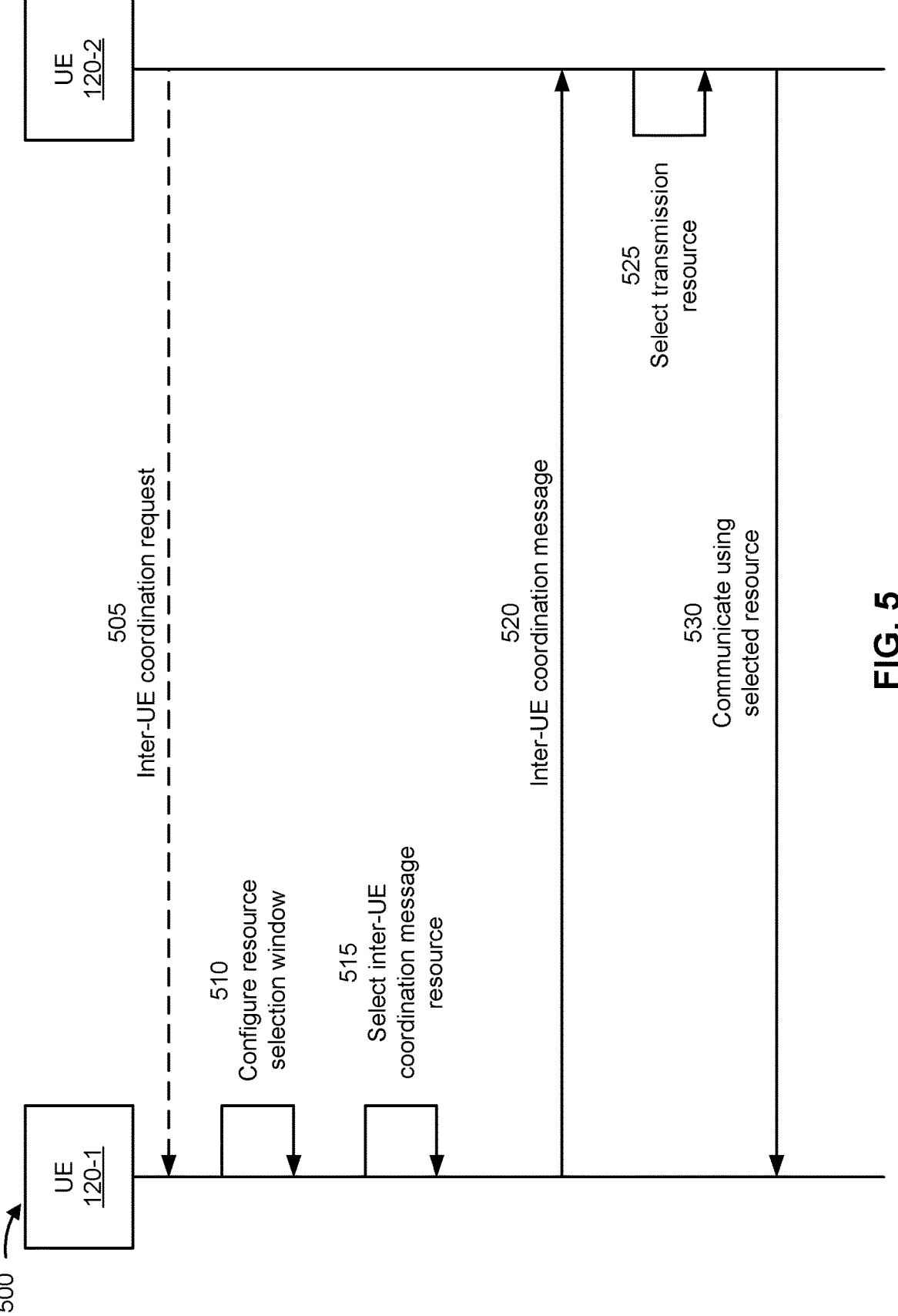
Figure 6:
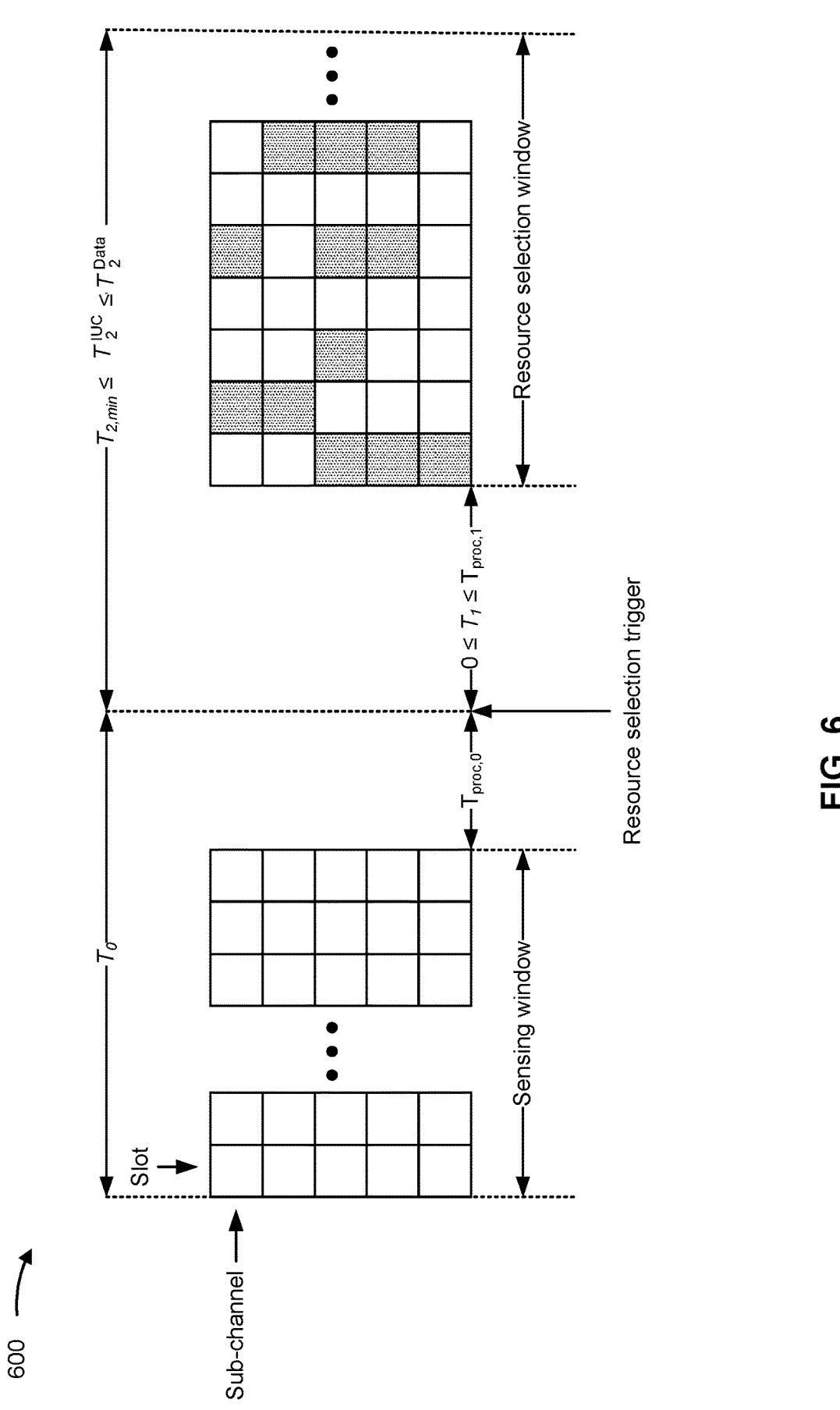

FIGS. 5-7 are diagrams illustrating examples 500, 600, 700, respectively, associated with resource selection for self-contained inter-UE coordination messages, in accordance with the present disclosure. As shown in FIG. 5, example 500 includes communication between a first UE 120-1 and a second UE 120-2. In some aspects, the first UE 120-1 and the second UE 120-2 may be included in a wireless network, such as wireless network 100. The first UE 120-1 and the second UE 120-2 may communicate via sidelink communications, as described elsewhere herein.

In some aspects, as shown by reference number 505, the second UE 120-2 may transmit, and the first UE 120-1 may receive, an inter-UE coordination request. The inter-UE coordination request may indicate a set of requirements associated with the second UE 120-2 transmitting a data packet to another UE (e.g., the first UE 120-1) via sidelink communications. For example, the inter-UE coordination request may indicate a size of the data packet, a priority associated with the data packet, or the UE to which the data packet is to be transmitted, among other examples.

In some aspects, the inter-UE coordination request may indicate that the first UE 120-1 is to provide scheme 1 coordination information (e.g., an indication of a set of preferred resources to be utilized by the second UE 120-2 for transmitting a communication and/or an indication of a set of non-preferred resources) to the second UE 120-2. The second UE 120-2 may utilize the coordination information to assist the second UE 120-2 in selecting one or more resources for transmitting a communication (e.g., to the first UE 120-1 or another UE 120).

In some aspects, the first UE 120-1 may generate a self-contained inter-UE coordination message indicating a set of preferred resources and/or a set of non-preferred resources based at least in part on the inter-UE coordination request. The self-contained inter-UE coordination message may correspond to an inter-UE coordination message that is transmitted independently of a data transmission (e.g., rather than an inter-UE coordination message that is multiplexed with and/or transmitted via a same resource as a data transmission).

As shown by reference number 510, the first UE 120-1 may configure a resource selection window for selecting a resource for transmitting the self-contained inter-UE coordination message. The resource selection window may be a time window from which sidelink resources may be selected. In some aspects, the first UE 120-1 may configure the resource selection window based at least in part on a configuration. The configuration may be received from a network (e.g., an access network associated with the first UE 120-1), may be received from an upper layer of the first UE 120-1 and provided to a physical (PHY) layer of the first UE 120-1, or may be pre-configured and stored in a memory of the first UE 120-1.

In some aspects, as shown in FIG. 6, the configuration may indicate one or more parameters associated with determining the resource selection window. In some aspects, the configuration may indicate a time interval ($T_0$), a processing time interval ($T_{proc,0}$) within the time interval ($T_0$), a minimum time interval ($T_{2,min}$), and a processing time interval ($T_1$), as described elsewhere herein.

In some aspects, the configuration may indicate an initial time interval $$(T_2^{IUC}),$$

a step size $$(\Delta T_2^{IUC})$$

for incrementing the initial time interval, and/or an available resource ratio ($X_{IUC}$ %) associated with a resource selection window.

As shown in FIG. 6, the initial time interval $$(T_2^{IUC})$$

may be a time duration that is subsequent to the time interval ($T_0$). In some aspects, the duration of the initial time interval $$(T_2^{IUC})$$

may be greater than the minimum time interval ($T_{2,min}$) and may be less than an initial time interval $$\left(T_2^{Data}\right)$$

used to determine a resource selection window for selecting a resource for transmitting a data communication.

As also shown in FIG. 6, the initial time interval $$\left(T_2^{IUC}\right)$$

may include the resource selection window and the processing time window ($T_1$). The processing time window ($T_1$) may be a pre-configured time duration that is specific to an implementation of the first UE 120-1 or configured by an access network associated with the first UE 120-1. A time duration of the resource selection window may correspond to a remaining time duration of the initial time interval $$\left(T_2^{IUC}\right).$$

In some aspects, the initial time interval $$\left(T_2^{IUC}\right)$$

may be different than an initial time interval associated with selecting resources for a data transmission. For example, the initial time interval $$\left(T_2^{IUC}\right)$$

may be less than an initial time interval associated with selecting resources for a data transmission.

The available resource ratio ($X_{IUC}$ %) may indicate a minimum percentage of available resources within the resource selection window. For example, the available resource ratio ($X_{IUC}$ %) may indicate that 20%, 25%, or 30%, among other examples, of the resources within the resource selection window are available for transmitting the inter-UE coordination message.

In some aspects, the available resource ratio ($X_{IUC}$ %) may be less than an available resource ratio ($X_{Data}$ %) used for selecting a resource for transmitting data. In some aspects, the available resource ratio ($X_{IUC}$ %) may be the same as the available resource ratio ($X_{Data}$ %) used for selecting a resource for transmitting data.

In some aspects, the configuration may indicate one or more parameters associated with an RSRP threshold used to determine whether a resource is an available resource. For example, the configuration may indicate an initial RSRP threshold, an RSRP threshold increment for incrementing the RSRP threshold, and an RSRP threshold constraint associated with a resource selection window. The first UE 120-1 may utilize the initial RSRP threshold to determine available resources within the resource selection window in a manner similar to that described elsewhere herein.

In some aspects, the initial RSRP threshold may be a pre-configured threshold stored in a memory of the first UE 120-1. In some aspects, the initial RSRP threshold may be a configured threshold. In some aspects, the initial RSRP threshold may be configured by an upper layer of the first UE 120-1 and provided to a physical (PHY) layer of the first UE 120-1. In some aspects, the initial RSRP threshold may be configured by a wireless node (e.g., a base station 110) included in an access network associated with the first UE 120-1.

In some aspects, the initial RSRP threshold may be different than an initial RSRP threshold associated with selecting a resource for a data transmission. For example, the initial RSRP threshold may be less than an initial RSRP threshold associated with selecting a resource for a data transmission.

The RSRP threshold increment may indicate a value by which the RSRP threshold is to be incremented when the available resource ratio is not satisfied, as described in greater detail elsewhere herein. In some aspects, the RSRP threshold increment may be less than an RSRP threshold increment associated with selecting a resource for transmitting data. By utilizing an RSRP threshold increment that is less than the RSRP threshold increment associated with selecting a resource for transmitting data, the first UE 120-1 may reduce a likelihood that a transmission of the inter-UE coordination message will interfere with a data transmission.

The RSRP constraint may indicate one or more constraints associated with incrementing the RSRP threshold. In some aspects, the RSRP constraint indicates a maximum RSRP threshold value. The maximum RSRP threshold value may indicate a maximum value $Th_{IUC}$ (e.g., −88 dBm, −90 dBm, etc.) to which the RSRP threshold value may be incremented.

In some aspects, the RSRP constraint indicates a maximum quantity of incrementations. For example, the RSRP constraint may indicate that the RSRP threshold may be incremented a maximum of N times (e.g., N=3).

The one or more resource selection criteria may indicate a set of rules or priorities for selecting a resource for transmitting the inter-UE coordination from the available resources within the resource selection window, as described elsewhere herein (e.g., as described below with respect to FIG. 7).

In operation, the first UE 120-1 may measure an RSRP of a signal from another UE in sidelink resource. The first UE 120-1 may project the RSRP of the signal to a corresponding resource within the resource selection window. If an observed RSRP satisfies the initial RSRP threshold (e.g., is lower than an initial RSRP), the first UE 120-1 may determine that the corresponding sidelink resource within the resource selection window may be available for transmitting the inter-UE coordination message. In some aspects, the first UE 120-1 may determine whether each resource within the resource selection window is available for transmitting the inter-UE coordination message.

In some aspects, the first UE 120-1 may determine that the available resource ratio ($X_{IUC}$ %) is satisfied (e.g., that at least 20% of the resources within the resource selection window are available for transmitting the inter-UE coordination message) and the first UE 120-1 may select the resource for transmitting the inter-UE coordination message from the available resources, as described in greater detail elsewhere herein.

In some aspects, the first UE 120-1 may determine that the available resource ratio ($X_{IUC}$ %) is not satisfied (e.g., that at least 20% of the resources within the resource selection window are available for transmitting the inter-UE coordination message). In some aspects, the first UE 120-1 may increase the size of the initial time interval $$(T_2^{IUC})$$

(e.g., to increase a quantity of resources within the resource selection window) based at least in part on the available resource ratio ($X_{IUC}$ %) not being satisfied. In some aspects, the first UE 120-1 may increment the initial time interval $$(T_2^{IUC})$$

by the step size $$(\Delta T_2^{IUC})$$

until a quantity of available resources within the resource selection window satisfies the available resource ratio ($X_{IUC}$ %).

In some aspects, the step size $$(\Delta T_2^{IUC})$$

may be dependent upon a priority associated with the data packet to be transmitted by the second UE 120-2. For example, the step size $$(\Delta T_2^{IUC})$$

may increment the initial time interval $$(T_2^{IUC})$$

by a first increment when the priority of the data packet to be transmitted by the second UE 120-2 is a first priority. The step size $$(\Delta T_2^{IUC})$$

may increment the initial time interval $$(T_2^{IUC})$$

by a second, larger increment when the priority of the data packet to be transmitted by the second UE 120-2 is a second, lower priority relative to the first priority.

In some aspects, a size of the step size $$(\Delta T_2^{IUC})$$

may be determined based at least in part on information stored in a data structure that maps step sizes to priorities of data packets. In some aspects, the data structure may be maintained by a wireless node (e.g., a base station 110) included in an access network associated with the first UE 120-1. In some aspects, the step size $$(\Delta T_2^{IUC})$$

may be determined (e.g., based at least in part on the data structure) by an upper layer of the first UE 120-1 and provided to a PHY layer of the first UE 120-1.

In some aspects, the step size $$(\Delta T_2^{IUC})$$

may be dependent upon a processing capability of the first UE 120-1. For example, the step size $$(\Delta T_2^{IUC})$$

may increment the initial time interval $$(T_2^{IUC})$$

by a first increment when the processing capability of the first UE 120-1 satisfies (e.g., is greater than) a threshold. The step size $$(\Delta T_2^{IUC})$$

may increment the initial time interval $$(T_2^{IUC})$$

by a second, smaller increment when the processing capability of the first UE 120-1 fails to satisfy the threshold or satisfies a different threshold.

In some aspects, the step size $$(\Delta T_2^{IUC})$$

may be a linear step size for linearly incrementing the initial time interval $$(T_2^{IUC}).$$

For example, the step size $$(\Delta T_2^{IUC})$$

may indicate a quantity of slots or an amount of time to be incrementally added to the initial time interval $$(T_2^{IUC})$$

when the quantity of available resources within the resource selection window fails to satisfy the available resource ratio ($X_{IUC}$ %). The first UE 120-1 may increment or increase the size of the initial time interval $$(T_2^{IUC})$$

by adding the quantity of slots or the amount of time to the initial time interval $$(T_2^{IUC}).$$

In some aspects, the step size $$(\Delta T_2^{IUC})$$

may be a multiplicative step size for multiplicatively incrementing the initial time interval $$(T_2^{IUC}).$$

For example, the step size $$(\Delta T_2^{IUC})$$

may indicate a factor (e.g., 2, 2.5, 3, or 4, among other examples) by which the initial time interval $$(T_2^{IUC})$$

is to be multiplied when the quantity of available resources within the resource selection window fails to satisfy the available resource ratio ($X_{IUC}$ %).

The first UE 120-1 may determine whether the available resource ratio ($X_{IUC}$ %) is satisfied based at least in part on incrementing the initial time interval $$(T_2^{IUC}).$$

In some aspects, the first UE 120-1 may determine whether the available resource ratio ($X_{IUC}$ %) is satisfied in a manner similar to that described elsewhere herein.

Alternatively, or additionally, when the available resource ratio ($X_{IUC}$ %) is not satisfied, the first UE 120-1 may increase the initial RSRP threshold to increase the quantity of available resources within the resource selection window. The first UE 120-1 may increment the initial RSRP threshold by the RSRP threshold increment until a quantity of available resources within the resource selection window satisfies the available resource ratio ($X_{IUC}$ %) or until the RSRP threshold constraint is satisfied. In some aspects, the RSRP threshold increment may be different than an RSRP threshold increment associated with selecting a resource for a data transmission. For example, the RSRP threshold increment may be smaller than the RSRP threshold increment associated with selecting a resource for a data transmission.

In some aspects, the RSRP threshold constraint may indicate a maximum RSRP threshold. When the quantity of available resources within the resource selection window fails to satisfy the available resource ratio ($X_{IUC}$ %), first UE 120-1 may increment the initial RSRP threshold by the RSRP threshold increment until the quantity of available resources within the resource selection window satisfies the available resource ratio ($X_{IUC}$ %) or until the RSRP threshold exceeds the maximum RSRP threshold.

In some aspects, the RSRP threshold constraint may indicate a maximum quantity of times the initial RSRP threshold can be incremented by the RSRP threshold increment. When the quantity of available resources within the resource selection window fails to satisfy the available resource ratio ($X_{IUC}$ %), the first UE 120-1 may increment the initial RSRP threshold by the RSRP threshold increment until the quantity of available resources within the resource selection window satisfies the available resource ratio ($X_{IUC}$ %) or until the RSRP threshold is incremented the maximum quantity of times.

In some aspects, the first UE 120-1 may determine that the quantity of available resources within the resource selection window satisfies the available resource ratio ($X_{IUC}$ %). As shown in FIG. 5, and by reference number 515, the first UE 120-1 may select a resource for transmitting the inter-UE coordination message resource from the available resources within the resource selection window.

In some aspects, the configuration indicates one or more criteria for selecting the resources from the available resources within the resource selection window. In some aspects, the one or more criteria may include one or more restrictions associated with selecting the resources from the available resources within the resource selection window. For example, the one or more criteria may indicate a restriction associated with a time domain of the resource selection window or a restriction associated with a frequency domain of the resource selection window, among other examples.

In some aspects, the one or more criteria may indicate a set of priorities or a hierarchical scheme for selecting the resources from the available resources within the resource selection window. In some aspects, the one or more criteria for selecting the resource from the available resources within the resource selection window may indicate that an edge subchannel is to be selected prior to a non-edge subchannel. The one or more criteria may indicate that an edge subchannel is to be selected prior to a non-edge subchannel based at least in part on an edge subchannel being less likely to be selected for a data transmission relative to a non-edge subchannel based at least in part on the potential higher adjacent interference associated with an edge channel and/or a UE reserving resource behavior.

For example, as shown in FIG. 7, with respect to slot 705, the first UE 120-1 may determine that resource 710 corresponds to an edge subchannel and that resources 715, 720, 725 correspond to non-edge subchannels. The first UE 120-1 may select resource 710 over resources 715, 720, 725 based at least in part on the one or more criteria indicating that an edge subchannel is to be selected prior to a non-edge subchannel.

In some aspects, the one or more criteria for selecting the resource from the available resources within the resource selection window may indicate that a subchannel that is not included in a set of continuous subchannels is to be selected prior to a subchannel that is included in the set of continuous subchannels. The one or more criteria may indicate that a subchannel that is not included in a set of continuous subchannels is to be selected prior to a subchannel that is included in the set of continuous subchannels based at least in part on a set of continuous subchannels being more likely to be selected for a data transmission relative to a subchannel that is not included in a set of continuous subchannels due to a size of the data being transmitted commonly requiring the use of multiple subchannels for the data transmission.

For example, as shown in FIG. 7, with respect to slot 705, the first UE 120-1 may determine that resource 710 corresponds to an edge subchannel that is not included in a set of continuous subchannels and that resources 715, 720, 725 correspond to subchannels that are included in a set of continuous subchannels. The first UE 120-1 may select resource 710 over resources 715, 720, 725 based at least in part on the one or more criteria indicating that a subchannel that is not included in a set of continuous subchannels is to be selected prior to a subchannel that is included in a set of continuous subchannels.

As another example, the one or more criteria for selecting the resource from the available resources within the resource selection window may indicate that a subchannel that is not included in a set of continuous subchannels is to be selected prior to an edge subchannel that is included in the set of continuous subchannels. For example, as shown in FIG. 7, with respect to slot 730, the first UE 120-1 may determine that resource 735 corresponds to a subchannel that is not included in a set of continuous subchannels and that resource 740 corresponds to an edge subchannel that is included in a set of continuous subchannels (e.g., resources 740, 745, 750). The first UE 120-1 may select resource 735 over resource 740 based at least in part on the one or more criteria indicating that a subchannel that is not included in a set of continuous subchannels is to be selected prior to an edge subchannel that is included in a set of continuous subchannels.

As shown in FIG. 5, and by reference number 520, the first UE 120-1 may transmit, and the second UE 120-2 may receive, the self-contained inter-UE coordination message. As shown by reference number 525, the second UE 120-2 may select a resource for a data transmission based at least in part on the self-contained inter-UE coordination message. For example, the self-contained inter-UE coordination message may indicate a set of preferred resources for the data transmission. The second UE 120-2 may select a resource from the set of preferred resources for the data transmission.

As shown by reference number 530, the second UE 120-2 may utilize the selected resource to transmit the data. In some aspects, as shown in FIG. 5, the second UE 120-2 may utilize the selected resource to transmit the data to the first UE 120-1. In some aspects, the second UE 120-2 may utilize the selected resource to transmit the data to another UE.

As indicated above, FIGS. 5-7 are provided as an example. Other examples may differ from what is described with respect to FIGS. 5-7.

FIG. 8 is a diagram illustrating an example process 800 performed, for example, by a UE, in accordance with the present disclosure. Example process 800 is an example where the UE (e.g., UE 120) performs operations associated with resource selection for a self-contained inter-UE coordination message.

As shown in FIG. 8, in some aspects, process 800 may include receiving a configuration for selecting a resource for a transmission of a self-contained inter-UE coordination message, wherein the configuration indicates an initial time interval, a step size for incrementing the initial time interval, and an available resource ratio associated with a resource selection window, and wherein the initial time interval is incremented by the step size until a quantity of available resources within the resource selection window satisfies the available resource ratio (block 810). For example, the UE (e.g., using communication manager 140 and/or reception component 1102, depicted in FIG. 11) may receive a configuration for selecting a resource for a transmission of a self-contained inter-UE coordination message, wherein the configuration indicates an initial time interval, a step size for incrementing the initial time interval, and an available resource ratio associated with a resource selection window, and wherein the initial time interval is incremented by the step size until a quantity of available resources within the resource selection window satisfies the available resource ratio, as described above.

As further shown in FIG. 8, in some aspects, process 800 may include selecting, based at least in part on the configuration, the resource for the transmission of the self-contained inter-UE coordination message from the quantity of available resources within the resource selection window (block 820). For example, the UE (e.g., using communication manager 140 and/or selection component 1108, depicted in FIG. 11) may select, based at least in part on the configuration, the resource for the transmission of the self-contained inter-UE coordination message from the quantity of available resources within the resource selection window, as described above.

As further shown in FIG. 8, in some aspects, process 800 may include transmitting the self-contained inter-UE coordination message via the selected resource (block 830). For example, the UE (e.g., using communication manager 140 and/or transmission component 1104, depicted in FIG. 11) may transmit the self-contained inter-UE coordination message via the selected resource, as described above.

Process 800 may include additional aspects, such as any single aspect or any combination of aspects described below and/or in connection with one or more other processes described elsewhere herein.

With respect to process 800, in a first aspect, the step size for incrementing the initial time interval is a linear step size for linearly incrementing the initial time interval.

With respect to process 800, in a second aspect, alone or in combination with the first aspect, the linear step size indicates a quantity of slots or an amount of time to be incrementally added to the initial time interval.

With respect to process 800, in a third aspect, alone or in combination with one or more of the first and second aspects, the step size for incrementing the initial time interval is a multiplicative step size for multiplicatively incrementing the initial time interval.

With respect to process 800, in a fourth aspect, alone or in combination with one or more of the first through third aspects, the multiplicative step size indicates a multiplication factor for multiplicatively incrementing the initial time interval.

With respect to process 800, in a fifth aspect, alone or in combination with one or more of the first through fourth aspects, the step size for incrementing the initial time interval is dependent upon a processing capability of the UE.

With respect to process 800, in a sixth aspect, alone or in combination with one or more of the first through fifth aspects, the step size is based at least in part on a packet priority of a data transmission corresponding to an inter-UE coordination request received by the UE.

With respect to process 800, in a seventh aspect, alone or in combination with one or more of the first through sixth aspects, the step size is determined based at least in part on a data structure mapping packet priorities to step sizes.

With respect to process 800, in an eighth aspect, alone or in combination with one or more of the first through seventh aspects, the data structure is maintained by an access network associated with the UE.

With respect to process 800, in a ninth aspect, alone or in combination with one or more of the first through eighth aspects, the step size is determined by an upper layer of the UE and provided to a physical layer of the UE.

With respect to process 800, in a tenth aspect, alone or in combination with one or more of the first through ninth aspects, the initial time interval is less than an initial time interval associated with selecting resources for a data transmission.

With respect to process 800, in an eleventh aspect, alone or in combination with one or more of the first through tenth aspects, the configuration indicates one or more criteria for selecting the resource from the available resources within the resource selection window.

With respect to process 800, in a twelfth aspect, alone or in combination with one or more of the first through eleventh aspects, the one or more criteria for selecting the resource from the available resources within the resource selection window include one or more of a restriction associated with a time domain of the resource selection window or a restriction associated with a frequency domain of the resource selection window.

With respect to process 800, in a thirteenth aspect, alone or in combination with one or more of the first through twelfth aspects, the one or more criteria for selecting the resource from the available resources within the resource selection window indicate that an edge subchannel is to be selected prior to a non-edge subchannel.

With respect to process 800, in a fourteenth aspect, alone or in combination with one or more of the first through thirteenth aspects, the one or more criteria for selecting the resource from the available resources within the resource selection window indicate that an edge subchannel that is not included in a set of continuous subchannels is to be selected prior to a subchannel that is included in the set of continuous subchannels.

With respect to process 800, in a fifteenth aspect, alone or in combination with one or more of the first through fourteenth aspects, the one or more criteria for selecting the resource from the available resources within the resource selection window indicate that a subchannel that is not included in a set of continuous subchannels is to be selected prior to an edge subchannel that is included in the set of continuous subchannels.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with the present disclosure. Example process 900 is an example where the UE (e.g., UE 120) performs operations associated with resource selection for a self-contained inter-UE coordination message.

As shown in FIG. 9, in some aspects, process 900 may include receiving a configuration for selecting a resource for a transmission of a self-contained inter-UE coordination message, wherein the configuration indicates an initial RSRP threshold, an RSRP threshold increment for incrementing the RSRP threshold, and an RSRP threshold constraint associated with a resource selection window, and wherein the initial RSRP threshold is incremented by the RSRP threshold increment until a quantity of available resources within the resource selection window satisfies an available resource ratio or until the RSRP threshold constraint is satisfied (block 910). For example, the UE (e.g., using communication manager 140 and/or reception component 1202, depicted in FIG. 12) may receive a configuration for selecting a resource for a transmission of a self-contained inter-UE coordination message, wherein the configuration indicates an initial RSRP threshold, an RSRP threshold increment for incrementing the RSRP threshold, and an RSRP threshold constraint associated with a resource selection window, and wherein the initial RSRP threshold is incremented by the RSRP threshold increment until a quantity of available resources within the resource selection window satisfies an available resource ratio or until the RSRP threshold constraint is satisfied, as described above.

As further shown in FIG. 9, in some aspects, process 900 may include selecting, based at least in part on the configuration, the resource for the transmission of the self-contained inter-UE coordination message from the quantity of available resources within the resource selection window (block 920). For example, the UE (e.g., using communication manager 140 and/or selection component 1208, depicted in FIG. 12) may select, based at least in part on the configuration, the resource for the transmission of the self-contained inter-UE coordination message from the quantity of available resources within the resource selection window, as described above.

As further shown in FIG. 9, in some aspects, process 900 may include transmitting the self-contained inter-UE coordination message via the selected resource (block 930). For example, the UE (e.g., using communication manager 140 and/or transmission component 1204, depicted in FIG. 12) may transmit the self-contained inter-UE coordination message via the selected resource, as described above.

Process 900 may include additional aspects, such as any single aspect or any combination of aspects described below and/or in connection with one or more other processes described elsewhere herein.

With respect to process 900, in a first aspect, the RSRP threshold constraint indicates a maximum RSRP threshold.

With respect to process 900, in a second aspect, alone or in combination with the first aspect, the RSRP threshold constraint indicates a maximum quantity of times that the initial RSRP threshold can be incremented by the RSRP threshold increment.

With respect to process 900, in a third aspect, alone or in combination with one or more of the first and second aspects, the initial RSRP threshold is less than an initial RSRP threshold associated with selecting a resource for a data transmission.

With respect to process 900, in a fourth aspect, alone or in combination with one or more of the first through third aspects, the RSRP threshold increment is different than an RSRP threshold increment associated with selecting a resource for a data transmission.

With respect to process 900, in a fifth aspect, alone or in combination with one or more of the first through fourth aspects, the RSRP threshold, the RSRP threshold increment, and the RSRP threshold constraint are configured by an access network associated with the UE.

With respect to process 900, in a sixth aspect, alone or in combination with one or more of the first through fifth aspects, the RSRP threshold, the RSRP threshold increment, and the RSRP threshold constraint are provided by an upper layer of the UE to a physical layer of the UE.

With respect to process 900, in a seventh aspect, alone or in combination with one or more of the first through sixth aspects, the configuration indicates one or more criteria for selecting the resource from the available resources within the resource selection window.

With respect to process 900, in an eighth aspect, alone or in combination with one or more of the first through seventh aspects, the one or more criteria for selecting the resource from the available resources within the resource selection window include one or more of a restriction associated with a time domain of the resource selection window or a restriction associated with a frequency domain of the resource selection window.

With respect to process 900, in a ninth aspect, alone or in combination with one or more of the first through eighth aspects, the one or more criteria for selecting the resource from the available resources within the resource selection window indicate that an edge subchannel is to be selected prior to a non-edge subchannel.

With respect to process 900, in a tenth aspect, alone or in combination with one or more of the first through ninth aspects, the one or more criteria for selecting the resource from the available resources within the resource selection window indicate that an edge subchannel that is not included in a set of continuous subchannels is to be selected prior to a subchannel that is included in the set of continuous subchannels.

With respect to process 900, in an eleventh aspect, alone or in combination with one or more of the first through tenth aspects, the one or more criteria for selecting the resource from the available resources within the resource selection window indicate that a subchannel that is not included in a set of continuous subchannels is to be selected prior to an edge subchannel that is included in the set of continuous subchannels.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with the present disclosure. Example process 1000 is an example where the UE (e.g., UE 120) performs operations associated with resource selection for a self-contained inter-UE coordination message.

As shown in FIG. 10, in some aspects, process 1000 may include receiving a configuration for selecting a resource for a transmission of a self-contained inter-UE coordination message, wherein the configuration indicates an initial time interval, a step size for incrementing the initial time interval, an available resource ratio associated with a resource selection window, an initial RSRP threshold, an RSRP threshold increment for incrementing the RSRP threshold, and an RSRP threshold constraint associated with a resource selection window, and wherein the initial time interval is incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied (block 1010). For example, the UE (e.g., using communication manager 140 and/or reception component 1302, depicted in FIG. 13) may receive a configuration for selecting a resource for a transmission of a self-contained inter-UE coordination message, wherein the configuration indicates an initial time interval, a step size for incrementing the initial time interval, an available resource ratio associated with a resource selection window, an initial RSRP threshold, an RSRP threshold increment for incrementing the RSRP threshold, and an RSRP threshold constraint associated with a resource selection window, and wherein the initial time interval is incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied, as described above.

As further shown in FIG. 10, in some aspects, process 1000 may include selecting, based at least in part on the configuration, the resource for the transmission of the self-contained inter-UE coordination message from the quantity of available resources within the resource selection window (block 1020). For example, the UE (e.g., using communication manager 140 and/or selection component 1308, depicted in FIG. 13) may select, based at least in part on the configuration, the resource for the transmission of the self-contained inter-UE coordination message from the quantity of available resources within the resource selection window, as described above.

As further shown in FIG. 10, in some aspects, process 1000 may include transmitting the self-contained inter-UE coordination message via the selected resource (block 1030). For example, the UE (e.g., using communication manager 140 and/or transmission component 1304, depicted in FIG. 13) may transmit the self-contained inter-UE coordination message via the selected resource, as described above.

Process 1000 may include additional aspects, such as any single aspect or any combination of aspects described below and/or in connection with one or more other processes described elsewhere herein.

With respect to process 1000, in a first aspect, the configuration indicates one or more criteria for selecting the resource from the available resources within the resource selection window, wherein the one or more criteria indicate that one or more of an edge subchannel is to be selected prior to a non-edge subchannel, or a subchannel that is not included in a set of continuous subchannels is to be selected prior to a subchannel that is included in the set of continuous subchannels.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
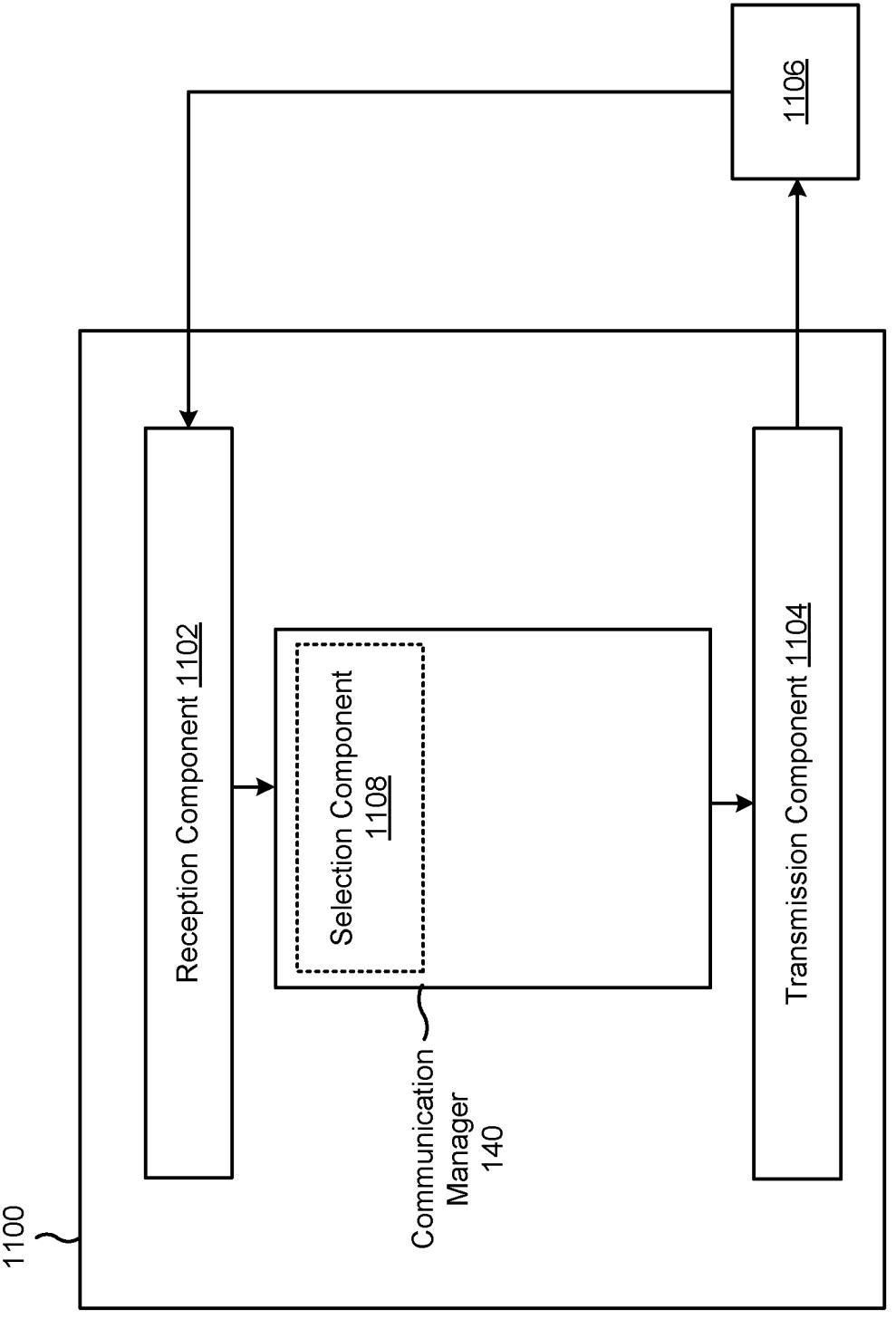
FIGS. 11-13 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a selection component 1108 among other examples.

In some aspects, the apparatus 1100 may be configured to perform one or more operations described herein in connection with FIGS. 5-7. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive a configuration for selecting a resource for a transmission of a self-contained inter-UE coordination message, wherein the configuration indicates an initial time interval, a step size for incrementing the initial time interval, and an available resource ratio associated with a resource selection window, and wherein the initial time interval is incremented by the step size until a quantity of available resources within the resource selection window satisfies the available resource ratio. The selection component 1108 may select, based at least in part on the configuration, the resource for the transmission of the self-contained inter-UE coordination message from the quantity of available resources within the resource selection window. The transmission component 1104 may transmit the self-contained inter-UE coordination message via the selected resource.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
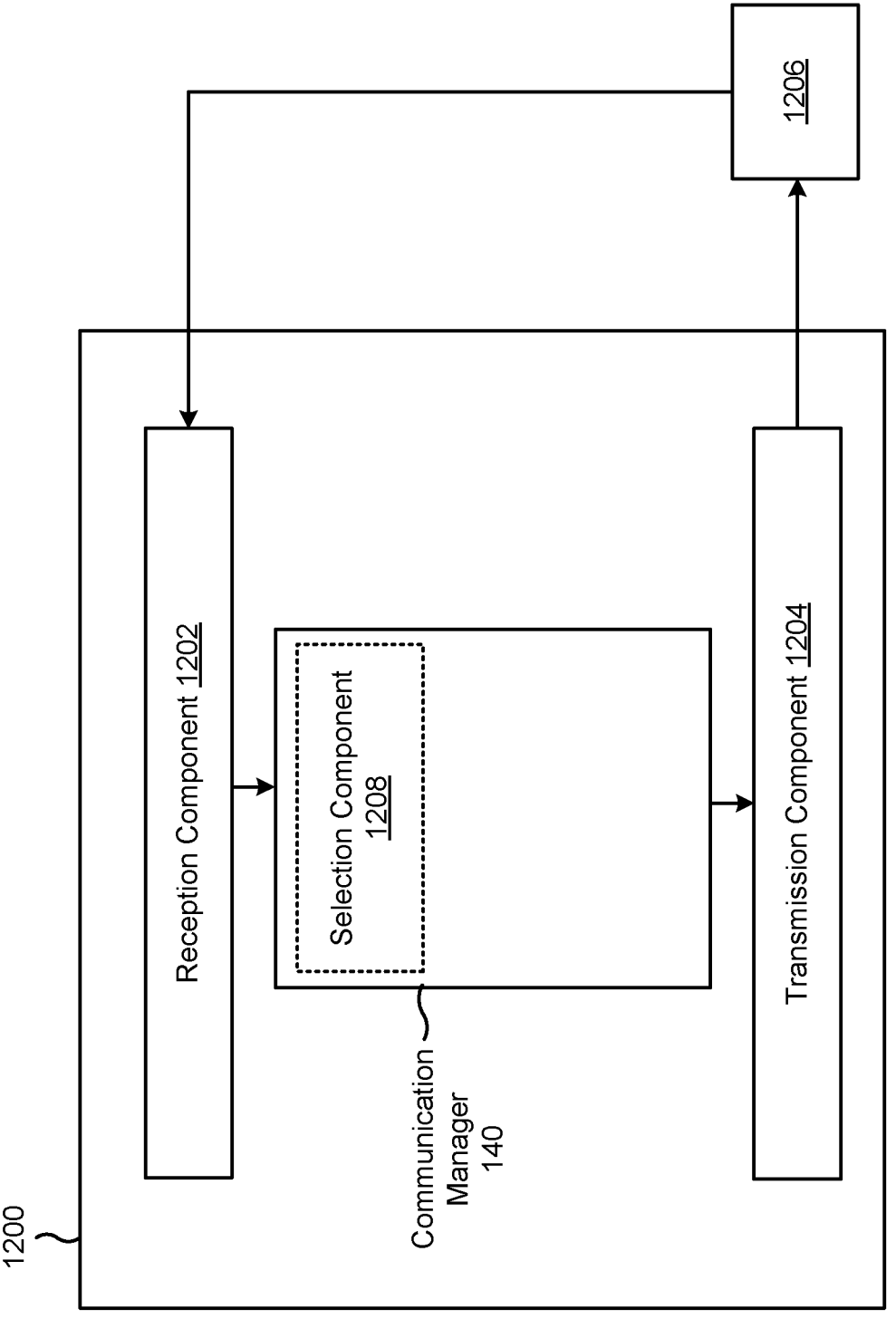

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a selection component 1208, among other examples.

In some aspects, the apparatus 1200 may be configured to perform one or more operations described herein in connection with FIGS. 5-7. Additionally, or alternatively, the apparatus 1200 may be configured to perform one or more processes described herein, such as process 900 of FIG. 9. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a configuration for selecting a resource for a transmission of a self-contained inter-UE coordination message, wherein the configuration indicates an initial RSRP threshold, an RSRP threshold increment for incrementing the RSRP threshold, and an RSRP threshold constraint associated with a resource selection window, and wherein the initial RSRP threshold is incremented by the RSRP threshold increment until a quantity of available resources within the resource selection window satisfies an available resource ratio or until the RSRP threshold constraint is satisfied. The selection component 1208 may select, based at least in part on the configuration, the resource for the transmission of the self-contained inter-UE coordination message from the quantity of available resources within the resource selection window. The transmission component 1204 may transmit the self-contained inter-UE coordination message via the selected resource.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
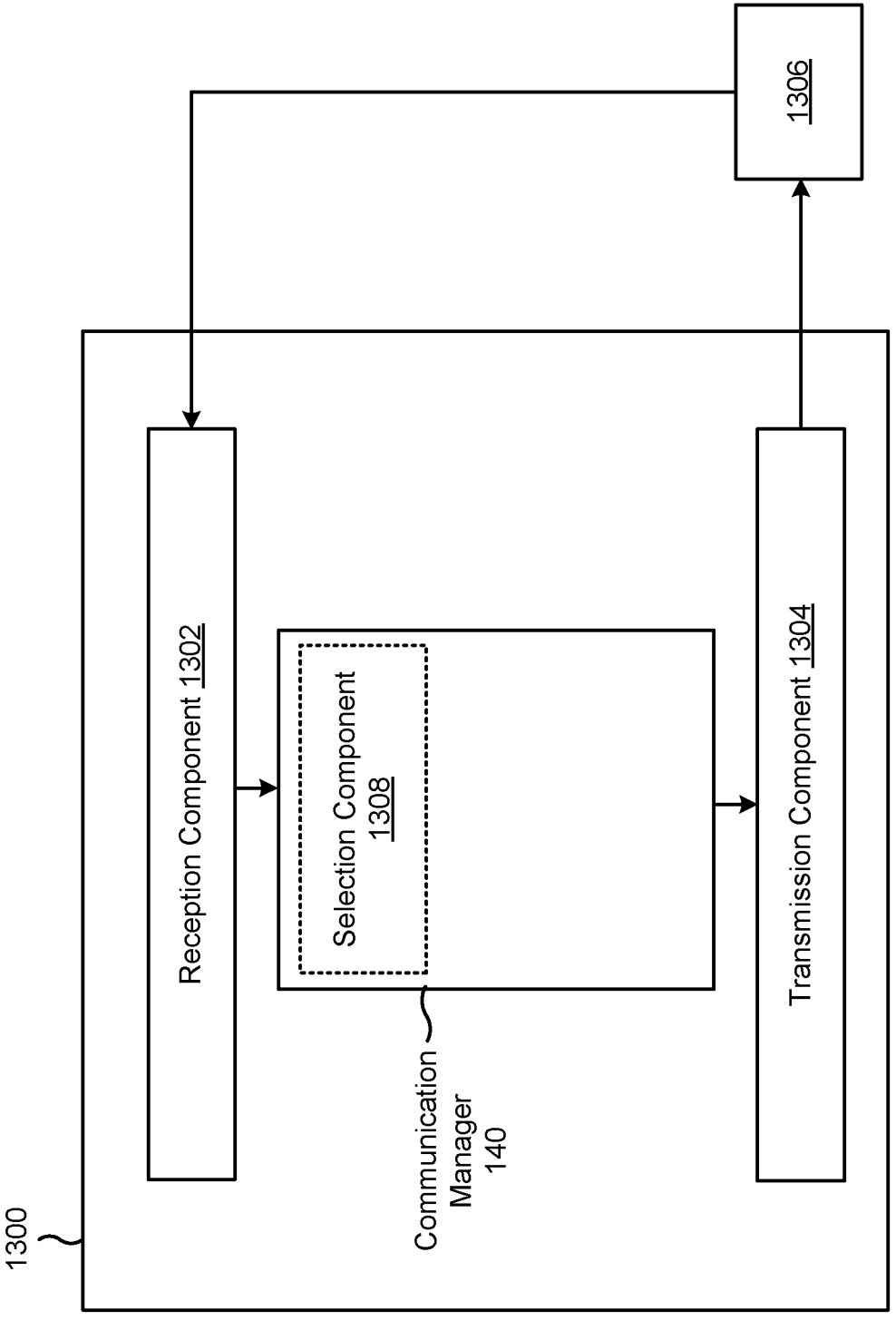

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a selection component 1308, among other examples.

In some aspects, the apparatus 1300 may be configured to perform one or more operations described herein in connection with FIGS. 5-7. Additionally, or alternatively, the apparatus 1300 may be configured to perform one or more processes described herein, such as process 1000 of FIG. 10. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/ processor, a memory, or a combination thereof, of the UE described in connection with FIG. 2. In some aspects, the transmission component 1304 may be co-located with the reception component 1302 in a transceiver.

The reception component 1302 may receive a configuration for selecting a resource for a transmission of a self-contained inter-UE coordination message, wherein the configuration indicates an initial time interval, a step size for incrementing the initial time interval, an available resource ratio associated with a resource selection window, an initial RSRP threshold, an RSRP threshold increment for incrementing the RSRP threshold, and an RSRP threshold constraint associated with a resource selection window, and wherein the initial time interval is incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied. The selection component 1308 may select, based at least in part on the configuration, the resource for the transmission of the self-contained inter-UE coordination message from the quantity of available resources within the resource selection window. The transmission component 1304 may transmit the self-contained inter-UE coordination message via the selected resource.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: receiving a configuration for selecting a resource for a transmission of a self-contained inter-UE coordination message, the configuration indicating an initial time interval, a step size for incrementing the initial time interval, and an available resource ratio associated with a resource selection window, and the initial time interval being incremented by the step size until a quantity of available resources within the resource selection window satisfies the available resource ratio; selecting, based at least in part on the configuration, the resource for the transmission of the self-contained inter-UE coordination message from the quantity of available resources within the resource selection window; and transmitting the self-contained inter-UE coordination message via the selected resource.

Aspect 2: The method of Aspect 1, wherein the step size for incrementing the initial time interval is a linear step size for linearly incrementing the initial time interval.

Aspect 3: The method of Aspect 2, wherein the linear step size indicates a quantity of slots or an amount of time to be incrementally added to the initial time interval.

Aspect 4: The method of one or more of Aspects 1 through 3, wherein the step size for incrementing the initial time interval is a multiplicative step size for multiplicatively incrementing the initial time interval.

Aspect 5: The method of Aspect 4, wherein the multiplicative step size indicates a multiplication factor for multiplicatively incrementing the initial time interval.

Aspect 6: The method of one or more of Aspects 1 through 5, wherein the step size for incrementing the initial time interval is dependent upon a processing capability of the UE.

Aspect 7: The method of one or more of Aspects 1 through 6, wherein the step size is based at least in part on a packet priority of a data transmission corresponding to an inter-UE coordination request received by the UE.

Aspect 8: The method of Aspect 7, wherein the step size is determined based at least in part on a data structure mapping packet priorities to step sizes.

Aspect 9: The method of Aspect 8, wherein the data structure is maintained by an access network associated with the UE.

Aspect 10: The method of Aspect 7, wherein the step size is determined by an upper layer of the UE and provided to a physical layer of the UE.

Aspect 11: The method of one or more of Aspects 1 through 10, wherein the initial time interval is less than an initial time interval associated with selecting resources for a data transmission.

Aspect 12: The method of one or more of Aspects 1 through 11, wherein the configuration indicates one or more criteria for selecting the resource from the available resources within the resource selection window.

Aspect 13: The method of Aspect 12, wherein the one or more criteria for selecting the resource from the available resources within the resource selection window includes one or more of a restriction associated with a time domain of the resource selection window or a restriction associated with a frequency domain of the resource selection window.

Aspect 14: The method of Aspect 12, wherein the one or more criteria for selecting the resource from the available resources within the resource selection window indicates that an edge subchannel is to be selected prior to a non-edge subchannel.

Aspect 15: The method of Aspect 12, wherein the one or more criteria for selecting the resource from the available resources within the resource selection window indicates that an edge subchannel that is not included in a set of continuous subchannels is to be selected prior to a subchannel that is included in the set of continuous subchannels.

Aspect 16: The method of Aspect 12, wherein the one or more criteria for selecting the resource from the available resources within the resource selection window indicates that a subchannel that is not included in a set of continuous subchannels is to be selected prior to an edge subchannel that is included in the set of continuous subchannels.

Aspect 17: A method of wireless communication performed by a UE, comprising: receiving a configuration for selecting a resource for a transmission of a self-contained inter-UE coordination message, the configuration indicating an initial RSRP threshold, an RSRP threshold increment for incrementing the RSRP threshold, and an RSRP threshold constraint associated with a resource selection window, and the initial RSRP threshold being incremented by the RSRP threshold increment until a quantity of available resources within the resource selection window satisfies an available resource ratio or until the RSRP threshold constraint is satisfied; selecting, based at least in part on the configuration, the resource for the transmission of the self-contained inter-UE coordination message from the quantity of available resources within the resource selection window; and transmitting the self-contained inter-UE coordination message via the selected resource.

Aspect 18: The method of Aspect 17, wherein the RSRP threshold constraint indicates a maximum RSRP threshold.

Aspect 19: The method of one or more of Aspects 17 and 18, wherein the RSRP threshold constraint indicates a maximum quantity of times the initial RSRP threshold can be incremented by the RSRP threshold increment.

Aspect 20: The method of one or more of Aspects 17 through 19, wherein the initial RSRP threshold is less than an initial RSRP threshold associated with selecting a resource for a data transmission.

Aspect 21: The method of one or more of Aspects 17 through 20, wherein the RSRP threshold increment is different than an RSRP threshold increment associated with selecting a resource for a data transmission.

Aspect 22: The method of one or more of Aspects 17 through 21, wherein the RSRP threshold, the RSRP threshold increment, and the RSRP threshold constraint are configured by an access network associated with the UE.

Aspect 23: The method of one or more of Aspects 17 through 22, wherein the RSRP threshold, the RSRP threshold increment, and the RSRP threshold constraint are provided by an upper layer of the UE to a physical layer of the UE.

Aspect 24: The method of one or more of Aspects 17 through 23, wherein the configuration indicates one or more criteria for selecting the resource from the available resources within the resource selection window.

Aspect 25: The method of Aspect 24, wherein the one or more criteria for selecting the resource from the available resources within the resource selection window includes one or more of a restriction associated with a time domain of the resource selection window or a restriction associated with a frequency domain of the resource selection window.

Aspect 26: The method of Aspect 24, wherein the one or more criteria for selecting the resource from the available resources within the resource selection window indicates that an edge subchannel is to be selected prior to a non-edge subchannel.

Aspect 27: The method of Aspect 24, wherein the one or more criteria for selecting the resource from the available resources within the resource selection window indicates that an edge subchannel that is not included in a set of continuous subchannels is to be selected prior to a subchannel that is included in the set of continuous subchannels.

Aspect 28: The method of Aspect 24, wherein the one or more criteria for selecting the resource from the available resources within the resource selection window indicates that a subchannel that is not included in a set of continuous subchannels is to be selected prior to an edge subchannel that is included in the set of continuous subchannels.

Aspect 29: A method of wireless communication performed by a UE, comprising: receiving a configuration for selecting a resource for a transmission of a self-contained inter-UE coordination message, the configuration indicating an initial time interval, a step size for incrementing the initial time interval, an available resource ratio associated with a resource selection window, an RSRP threshold, an RSRP threshold increment for incrementing the RSRP threshold, and an RSRP threshold constraint associated with a resource selection window, and the initial time interval being incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied; selecting, based at least in part on the configuration, the resource for the transmission of the self-contained inter-UE coordination message from the quantity of available resources within the resource selection window; and transmitting the self-contained inter-UE coordination message via the selected resource.

Aspect 30: The method of Aspect 29, wherein the configuration indicates one or more criteria for selecting the resource from the available resources within the resource selection window, wherein the one or more criteria indicates that one or more of: an edge subchannel is to be selected prior to a non-edge subchannel, or a subchannel that is not included in a set of continuous subchannels is to be selected prior to a subchannel that is included in the set of continuous subchannels.

Aspect 31: An apparatus for wireless communication at a device, comprising a processor; memory coupled with the processor; and instructions stored in the memory and executable by the processor to cause the apparatus to perform the method of one or more of Aspects 1 through 16.

Aspect 32: A device for wireless communication, comprising a memory and one or more processors coupled to the memory, the one or more processors configured to perform the method of one or more of Aspects 1 through 16.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1 through 16.

Aspect 35: A non-transitory computer-readable medium storing a set of instructions for wireless communication, the set of instructions comprising one or more instructions that, when executed by one or more processors of a device, cause the device to perform the method of one or more of Aspects 1 through 16.

Aspect 36: An apparatus for wireless communication at a device, comprising a processor; memory coupled with the processor; and instructions stored in the memory and executable by the processor to cause the apparatus to perform the method of one or more of Aspects 17 through 28.

Aspect 37: A device for wireless communication, comprising a memory and one or more processors coupled to the memory, the one or more processors configured to perform the method of one or more of Aspects 17 through 28.

Aspect 38: An apparatus for wireless communication, comprising at least one means for performing the method of one or more of Aspects 17 through 28.

Aspect 39: A non-transitory computer-readable medium storing code for wireless communication, the code comprising instructions executable by a processor to perform the method of one or more of Aspects 17 through 28.

Aspect 40: A non-transitory computer-readable medium storing a set of instructions for wireless communication, the set of instructions comprising one or more instructions that, when executed by one or more processors of a device, cause the device to perform the method of one or more of Aspects 17 through 28.

Aspect 41: An apparatus for wireless communication at a device, comprising a processor; memory coupled with the processor; and instructions stored in the memory and executable by the processor to cause the apparatus to perform the method of one or more of Aspects 29 and 30.

Aspect 42: A device for wireless communication, comprising a memory and one or more processors coupled to the memory, the one or more processors configured to perform the method of one or more of Aspects 29 and 30.

Aspect 43: An apparatus for wireless communication, comprising at least one means for performing the method of one or more of Aspects 29 and 30.

Aspect 44: A non-transitory computer-readable medium storing code for wireless communication, the code comprising instructions executable by a processor to perform the method of one or more of Aspects 29 and 30.

Aspect 45: A non-transitory computer-readable medium storing a set of instructions for wireless communication, the set of instructions comprising one or more instructions that, when executed by one or more processors of a device, cause the device to perform the method of one or more of Aspects 29 and 30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive a configuration for selecting a resource for a transmission of a self-contained inter-UE coordination message, the configuration indicating an initial time interval, a step size for incrementing the initial time interval, and an available resource ratio associated with a resource selection window, and the initial time interval being incremented by the step size until a quantity of available resources within the resource selection window satisfies the available resource ratio, the configuration indicating one or more criteria for selecting the resource from the available resources within the resource selection window, the one or more criteria indicating one or more of:

that an edge subchannel is to be selected prior to a non-edge subchannel;

that an edge subchannel that is not included in a set of continuous subchannels is to be selected prior to a subchannel that is included in the set of continuous subchannels; or that a subchannel that is not included in a set of continuous subchannels is to be selected prior to an edge subchannel that is included in the set of continuous subchannels;

select, based at least in part on the configuration, the resource for the transmission of the self-contained inter-UE coordination message from the quantity of available resources within the resource selection window; and transmit the self-contained inter-UE coordination message via the selected resource to another UE, wherein the self-contained inter-UE coordination message indicates a preferred resource to be utilized by the other UE for transmitting a communication.

2. The UE of claim 1, wherein the step size for incrementing the initial time interval is a linear step size for linearly incrementing the initial time interval.

3. The UE of claim 2, wherein the linear step size indicates a quantity of slots or an amount of time to be incrementally added to the initial time interval.

4. The UE of claim 1, wherein the step size for incrementing the initial time interval is a multiplicative step size for multiplicatively incrementing the initial time interval.

5. The UE of claim 4, wherein the multiplicative step size indicates a multiplication factor for multiplicatively incrementing the initial time interval.

6. The UE of claim 1, wherein the step size for incrementing the initial time interval is dependent upon a processing capability of the UE.

7. The UE of claim 1, wherein the step size is based at least in part on a packet priority of a data transmission corresponding to an inter-UE coordination request received by the UE.

8. The UE of claim 7, wherein the step size is determined based at least in part on a data structure mapping packet priorities to step sizes.

9. The UE of claim 8, wherein the data structure is maintained by an access network associated with the UE.

10. The UE of claim 7, wherein the step size is determined by an upper layer of the UE and provided to a physical layer of the UE.

11. The UE of claim 1, wherein the initial time interval is less than an initial time interval associated with selecting resources for a data transmission.

12. The UE of claim 1, wherein the one or more criteria for selecting the resource from the available resources within the resource selection window includes one or more of a restriction associated with a time domain of the resource selection window or a restriction associated with a frequency domain of the resource selection window.

13. A UE for wireless communication, comprising:
a memory; and
one or more processors, coupled to the memory, configured to:
receive a configuration for selecting a resource for a transmission of a self-contained inter-UE coordination message, the configuration indicating an initial reference signal received power (RSRP) threshold, an RSRP threshold increment for incrementing the RSRP threshold, and an RSRP threshold constraint associated with a resource selection window, and the initial RSRP threshold being incremented by the RSRP threshold increment until a quantity of available resources within the resource selection window satisfies an available resource ratio or until the RSRP threshold constraint is satisfied, the configuration indicating one or more criteria for selecting the resource from the available resources within the resource selection window, the one or more criteria indicating one or more of:

that an edge subchannel is to be selected prior to a non-edge subchannel;

that an edge subchannel that is not included in a set of continuous subchannels is to be selected prior to a subchannel that is included in the set of continuous subchannels; or that a subchannel that is not included in a set of continuous subchannels is to be selected prior to an edge subchannel that is included in the set of continuous subchannels;

select, based at least in part on the configuration, the resource for the transmission of the self-contained inter-UE coordination message from the quantity of available resources within the resource selection window; and transmit the self-contained inter-UE coordination message via the selected resource to another UE, wherein the self-contained inter-UE coordination message indicates a preferred resource to be utilized by the other UE for transmitting a communication.

14. The UE of claim 13, wherein the RSRP threshold constraint indicates a maximum RSRP threshold.

15. The UE of claim 13, wherein the RSRP threshold constraint indicates a maximum quantity of times the initial RSRP threshold can be incremented by the RSRP threshold increment.

16. The UE of claim 13, wherein the initial RSRP threshold is less than an initial RSRP threshold associated with selecting a resource for a data transmission.

17. The UE of claim 13, wherein the RSRP threshold increment is different than an RSRP threshold increment associated with selecting a resource for a data transmission.

18. The UE of claim 13, wherein the RSRP threshold, the RSRP threshold increment, and the RSRP threshold constraint are configured by an access network associated with the UE.

19. The UE of claim 13, wherein the RSRP threshold, the RSRP threshold increment, and the RSRP threshold constraint are provided by an upper layer of the UE to a physical layer of the UE.

20. The UE of claim 13, wherein the one or more criteria for selecting the resource from the available resources within the resource selection window includes one or more of a restriction associated with a time domain of the resource selection window or a restriction associated with a frequency domain of the resource selection window.

21. A UE for wireless communication, comprising:
a memory; and
one or more processors, coupled to the memory, configured to:
receive a configuration for selecting a resource for a transmission of a self-contained inter-UE coordination message, the configuration indicating an initial time interval, a step size for incrementing the initial time interval, an available resource ratio associated with a resource selection window, an initial reference signal received power (RSRP) threshold, an RSRP threshold increment for incrementing the RSRP threshold, and an RSRP threshold constraint associated with a resource selection window, and the initial time interval being incremented by the step size until a quantity of available resources within the resource selection window satisfies the available resource ratio and the initial RSRP threshold is incremented by the RSRP threshold increment until the quantity of available resources within the resource selection window satisfies the available resource ratio or until the RSRP threshold constraint is satisfied, the configuration indicating one or more criteria for selecting the resource from the available resources within the resource selection window, wherein the one or more criteria indicating one or more of:

that an edge subchannel is to be selected prior to a non-edge subchannel, or that a subchannel that is not included in a set of continuous subchannels is to be selected prior to a subchannel that is included in the set of continuous subchannels;

select, based at least in part on the configuration, the resource for the transmission of the self-contained inter-UE coordination message from the quantity of available resources within the resource selection window; and transmit the self-contained inter-UE coordination message via the selected resource to another UE, wherein the self-contained inter-UE coordination message indicates a preferred resource to be utilized by the other UE for transmitting a communication.

\* \* \* \* \*